United States Patent
Uan-Zo-Li et al.

(10) Patent No.: US 9,553,519 B2
(45) Date of Patent: Jan. 24, 2017

(54) SMALL FORM FACTOR VOLTAGE ADAPTERS AND DEVICES, PLATFORMS, AND TECHNIQUES FOR MANAGING POWER BOOSTS

(71) Applicants: Alexander Uan-Zo-Li, Hillsboro, OR (US); Christine Kim, Hillsboro, OR (US); Thyagarajan Srinivasan, San Jose, CA (US); George Daskalakis, Forest Grove, OR (US)

(72) Inventors: Alexander Uan-Zo-Li, Hillsboro, OR (US); Christine Kim, Hillsboro, OR (US); Thyagarajan Srinivasan, San Jose, CA (US); George Daskalakis, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 14/294,822

(22) Filed: Jun. 3, 2014

(65) Prior Publication Data
US 2014/0355308 A1 Dec. 4, 2014

Related U.S. Application Data

(60) Provisional application No. 61/830,967, filed on Jun. 4, 2013.

(51) Int. Cl.
| | | |
|---|---|---|
| *H02M 3/24* | (2006.01) | |
| *H02M 3/335* | (2006.01) | |
| *H02M 5/32* | (2006.01) | |
| *H02M 7/537* | (2006.01) | |
| *H02M 1/32* | (2007.01) | |
| *H02M 7/00* | (2006.01) | |
| *H02M 1/00* | (2006.01) | |
| *H02M 3/156* | (2006.01) | |

(52) U.S. Cl.
CPC .......... *H02M 3/33507* (2013.01); *H02M 1/32* (2013.01); *H02M 3/335* (2013.01); *H02M 5/32* (2013.01); *H02M 7/537* (2013.01); *H02M 7/003* (2013.01); *H02M 2001/0019* (2013.01); *H02M 2001/325* (2013.01); *H02M 2003/1566* (2013.01)

(58) Field of Classification Search
CPC ....................................................... H02M 3/24
USPC .................................................... 363/15, 125
See application file for complete search history.

(56) References Cited

U.S. PATENT DOCUMENTS

| | | | | |
|---|---|---|---|---|
| 5,940,282 A | * | 8/1999 | Oglesbee | H02M 1/10 |
| | | | | 307/151 |
| 2002/0075711 A1 | * | 6/2002 | Miles | H02M 7/003 |
| | | | | 363/146 |
| 2004/0196000 A1 | * | 10/2004 | Wei | H01R 13/60 |
| | | | | 320/111 |

(Continued)

*Primary Examiner* — Matthew Nguyen
*Assistant Examiner* — Trinh Dang
(74) *Attorney, Agent, or Firm* — Green, Howard & Mughal, LLP

(57) ABSTRACT

Techniques and devices related to power adapters for mobile devices and, in particular, small form factor power adapters that allow a voltage droop during a power pulse exceeding a maximum output of the power adapter are discussed. For example, a small form factor and low voltage power adapter may include an adapter output power protection control that limits an output of the power adapter in response to a power pulse exceeding a maximum output of the power adapter.

22 Claims, 14 Drawing Sheets

(56) References Cited

U.S. PATENT DOCUMENTS

2009/0066408 A1* 3/2009 Fujiwara ................ H02M 3/07
327/536
2011/0068742 A1* 3/2011 McCurry ............ H01M 2/1022
320/114
2011/0260681 A1* 10/2011 Guccione .............. H02J 7/0054
320/108

* cited by examiner

2020

SMALL FORM FACTOR VOLTAGE ADAPTERS AND DEVICES, PLATFORMS, AND TECHNIQUES FOR MANAGING POWER BOOSTS

RELATED APPLICATIONS

The present application claims the benefit of U.S. Provisional Application No. 61/830,967 filed Jun. 4, 2013, and titled "OVERNIGHT POWER ADAPTER", the contents of which are hereby incorporated by reference in their entirety.

TECHNICAL FIELD

Embodiments described herein generally relate to power adapters for mobile devices and more particularly relate to small form factor power adapters that allow a voltage droop during a power pulse exceeding a maximum output of the power adapter.

BACKGROUND

While the computer industry has made clear progress in building smaller and lighter mobile platforms/devices (laptops, tablets, smartphones, etc.), alternating current (AC) adapters have not followed suit. One of the reasons for this is that AC adapters are specified to provide the highest power required by the platforms they support. If the platform requires more power than specified, the adapter will shut down. Most consumers feel that today's adapters are too bulky and should be smaller. This is particularly true for mobile platforms. The wide consumer adoption of Narrow Voltage Direct Current (NVDC) and Hybrid Power Boost (HPB) systems allows the adapters to be designed for smaller output power, because the battery can supplement the adapter if the platform power consumption exceeds the adapter capability. For example, a traditional laptop with a thermal design power (TDP) of 65 Watts (W) actually may consume an average power of much less than half of that.

An even more interesting situation arises for thin laptops that have low power consumption. Today it is common that even for these types of mobile platforms, adapters are commonly designed for 45 W of sustained power capability. Even though, in most cases, real life applications would require much less than 45 W, and a 12 W adapter may prove to be quite sufficient for most uses of platforms such as these. Moreover, some users may find it useful to purchase an adapter which is designed mostly for overnight charging of the laptop battery, while they expect to use the mobile platform while using the battery—a trend which should become more prevalent with longer battery run-time—analogous to today's cell phones, ebooks, and tablets. A small adapter may still support the normal operation of the system, but it may require the battery to cover the power spikes by supplementing the adapter with the battery. A small adapter may also allow the system to stay alive or discharge its battery much more slowly even at a heavy load.

As such, there is a demand for further reduction in the size of power adapters as well as a need for systems and power adapters to provide increasing performance to meet user expectations. Such problems may become critical as the desire to use mobile devices with ever increasing capabilities becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
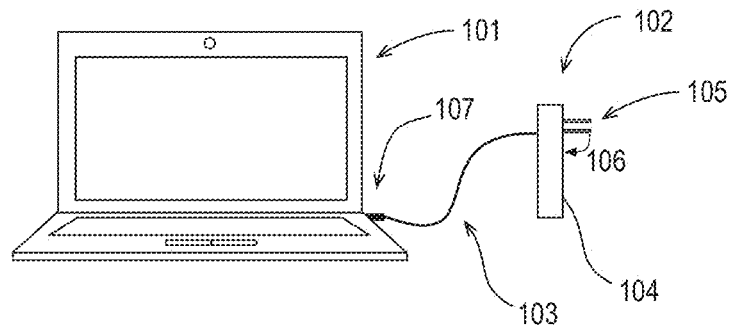
FIG. 1 is an illustrative diagram of an example system including an example mobile device and an example voltage adapter.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Furthermore, the following description sets forth various power adapter implementations that may be manifested in architectures associated with switched mode power supply architectures. However, implementation of the techniques and/or arrangements described herein are not restricted to particular architectures or power adapter circuit topology. For example, any isolated power supply topology may be used based on the discussed techniques.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

Methods, devices, systems, and articles are described herein related to voltage adapters or power supplies for powering mobile devices and, in particular, to small form factor power adapters that allow a voltage droop during a power pulse exceeding a maximum output of the power adapter.

As described above, current power voltage adapters or power supplies may be designed for a highest possible (e.g., maximum) power required by the system or platform being supported. Such design rules may generate bulky voltage adapters that may be undesirable particularly to mobile device users and travellers and the like. In some instances, the reason for such design rules may be that the AC adapter would shut down if the platform being supported required more power than a maximum output of the voltage adapter. The techniques discussed herein may overcome such problems by allowing for, in instances where the platform demanded more power than the maximum output of the voltage adapter, a voltage droop from the voltage adapter. Such a voltage droop may be managed by the platform and/or the voltage adapter may be designed to sustain power to the platform even with the droop during a power pulse or spike or the like such that the performance of the platform is not substantially hindered by the droop. Such techniques may allow for small form factor and pleasing voltage adapters that may be desirable to mobile device users.

In some embodiments discussed herein, a voltage adapter to a power mobile device may include a switch and transformer coupled to the switch. For example, the switch and transformer may provide for direct current (DC) to DC conversion. Furthermore, the voltage adapter may include an output rectifier coupled to the transformer, an output decoupler capacitor coupled to the rectifier and configured to provide a direct current output from the voltage adapter, and an adapter output power protection controller coupled to the switch and configured to control the transformer via the switch to provide a maximum output power or current to the output decoupler capacitor in response to a power pulse exceeding a maximum output of the voltage adapter.

In some embodiments, a voltage adapter to power mobile device may include an input rectifier configured to convert an alternating current input to DC, a DC-DC converter configured to convert the DC to an output DC, and an adapter output power protection controller coupled to the DC-DC converter and configured to control the DC-DC converter to provide a maximum output power or a maximum output current in response to a power pulse on the voltage adapter exceeding a maximum output of the voltage adapter.

Furthermore, some voltage adapters as discussed herein may have a housing and AC prongs configured to pivot between an enclosed position within the housing to an extended position such that at least a portion of the AC prongs are outside of the housing. The voltage adapter may include the AC prongs in a first region of the housing and other devices (e.g., a transformer, a rectifier, an output decoupler capacitor, and an adapter output power protection controller or a DC-DC converter and an adapter output power protection controller) in a second region of the housing adjacent to the first region. Such a design may allow for a relatively thin voltage adapter design. Furthermore, the voltage adapter may, in some examples, include a wire having a coupler configured to extend to a mobile device and the housing may include an exterior groove extending around the housing for storing the wire and another groove for receiving the coupler when not in use. Such a voltage adapter may provide for charging of the platform when not in use, for supporting the platform when in use, and for a small form factor and convenient product for transport when the voltage adapter is not being used.

In some examples, the platform being supported may implement techniques associated with the voltage adapters discussed herein. For example, the platform may employ a mobile device battery during the discussed voltage adapter droop, use a lower central processing unit (CPU) frequency during the droop, and/or limit demands on the voltage adapter. In some embodiments, the mobile device may limit power boost operations, for example, to a duration not greater than a maximum power boost duration associated with the voltage adapter and the mobile device may further limit power boost operations to a frequency such that a time between power boost operations is at least a predetermined duration that allows recharge (or partial recharge) of the voltage adapter. For example, the maximum power boost duration and the recharge time of the voltage adapter may be associated with an output decoupler capacitor of the voltage adapter.

FIG. 1 is an illustrative diagram of an example system 100 including an example mobile device 101 and an example voltage adapter 102, arranged in accordance with at least some implementations of the present disclosure. As shown in FIG. 1, mobile device 101 and voltage adapter 102 may be coupled via a wire 103 and a coupler 107 of voltage adapter 102. Furthermore, voltage adapter 102 may include a housing 104 including components, as discussed further herein, and alternating current (AC) prongs 105. As is discussed further below, AC prongs 105 may be configured to pivot from an extended position (as shown) such that at least a portion of AC prongs 105 are outside of housing 104 (e.g., configured to be plugged in to an AC input such as a wall outlet or the like) to an enclosed position in a direction 106. For example, in the enclosed position, AC prongs may be within housing 104 for storage or transport or the like.

In the illustrated example, mobile device 101 is an ultrabook. However, system 100 may include any suitable mobile device 101. For example, mobile device 101 may include a laptop, an ultrabook, a smartphones, a tablet, or the like. For example, mobile device 101 may include any such device and mobile device 101 may be described as a computing device or as a mobile device as used herein. In the illustration of FIG. 1, mobile device 101 and voltage adapter 102 are not drawn to scale and, in particular, voltage adapter 102 has been provided in a scale suitable for viewing the components thereof. As is discussed further herein, voltage adapter 102 may have dimensions making it suitable for easy storage and/or transport by a user.

For example, voltage adapter 102 may provide for a small travel AC adapter such that embodiments of a small travel AC adapter are described. For example, voltage adapter 102 may support overnight charging (or any long duration charging while mobile device 101 is not in use) and voltage adapter 102 may support system operation (e.g., operation of mobile device 101) during use. In some examples, voltage adapter 102 may support the operation of mobile device 102 as supplemented by a battery of mobile device 102. Furthermore, voltage adapter may be aesthetically pleasing and convenient.

As discussed, in some examples, voltage adapter 102 may provide battery charging while mobile device 101 is not in use. Example voltage adapter power output capabilities can be seen in Table 1, which is a summary of a series of tests on charging a 45 Watt-hour (Whr) battery with a 12 Watt (W) adapter (the actual maximum power available to charge the battery was limited at 11 W, which assumed about 91% efficiency of the charger at thermal design power (TDP)).

TABLE 1

| Charge Times for a Range of C-Ratings for Two Types of 45 Wh | | | | | | | | |
|---|---|---|---|---|---|---|---|---|
| 3901 mAh | Battery Type 1 | | | | 2196 mAh | Battery Type 2 | | |
| C-rate | CC | CV | Total | Discharge | C-rate | CC | CV | Total |
| 0.197 | 4:45:03 | 1:11:16 | 5:56:19 | 422 mA | 0.192 | 4:50:17 | 0:59:06 | 5:49:23 |
| 0.246 | 3:40:54 | 1:19:50 | 5:00:44 | 528 mA | 0.240 | 3:48:35 | 0:59:39 | 4:48:14 |
| 0.295 | 3:03:28 | 1:14:35 | 4:18:03 | 633 mA | 0.288 | 3:05:07 | 1:07:12 | 4:12:19 |
| 0.345 | 2:32:15 | 1:21:55 | 3:54:10 | 739 mA | 0.337 | 2:37:27 | 1:10:57 | 3:48:24 |

As shown, Table 1 summarizes the charge time (at constant current (CC) and constant voltage (CV)) for a range of current C-ratings for 2 types of 45 Wh batteries. It can be seen that a 12 W adapter can readily charge a battery in 5 hours if the charge rate during Constant Current Mode exceeds 0.25 C for both of the example batteries. Such results illustrate a lower voltage adapter (e.g., less than a 45 W adapter as discussed, and, in the example, a 12 W adapter) may provide users an overnight charge in many implementations.

Figure 2:
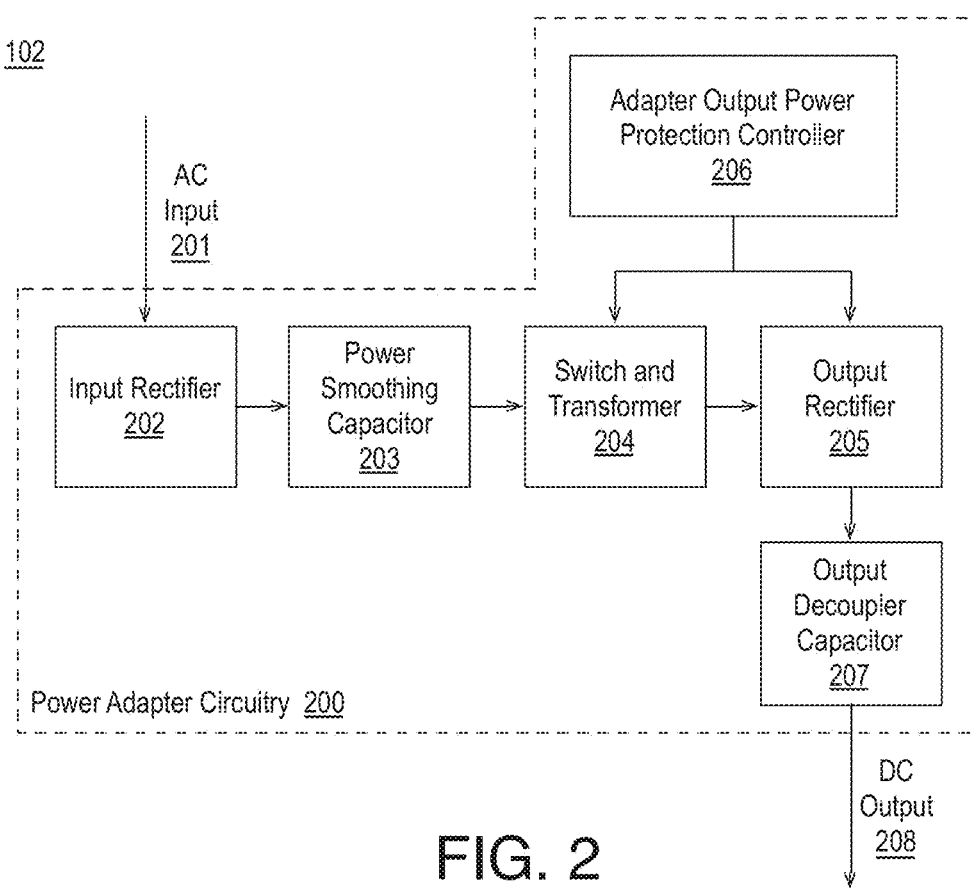
FIG. 2 is an illustrative block diagram of example voltage adapter.

FIG. 2 is an illustrative block diagram of example voltage adapter 102, arranged in accordance with at least some implementations of the present disclosure. As shown in FIG. 2, voltage adapter 102 may include power adapter circuitry 200, which may include an input rectifier 202, a power smoothing capacitor 203, a switch and a transformer 204, an output rectifier 205, an output decoupler capacitor 207, and/or an adapter output power protection controller 206. As shown, voltage adapter 102 may receive an alternating current (AC) input 201 and voltage adapter 102 may provide a direct current (DC) output 208. In some examples, switch and transformer 204 and output rectifier 205 or switch and transformer 204, output rectifier 205, and output decoupler capacitor 207 may provide a DC-DC converter or DC-DC converter circuitry as discussed herein. For example, as used herein, a DC-DC converter of power adapter circuitry 200 may include switch and transformer 204 and output rectifier 205 or switch and transformer 204, output rectifier 205, and output decoupler capacitor 207 or other suitable DC-DC converter circuitry.

As discussed with respect to Table 1, a lower voltage and thereby smaller voltage adapter may suitably charge a battery of mobile device 101 over a duration when mobile device 101 is not in use. In order for voltage adapter 102 (e.g., a travel adapter) to operate during a normal mode of operation of mobile device 101 (e.g., when mobile device 101 is running an actual application or applications), voltage adapter 102 may need to be able to support a power pulse such as a power pulse or spike (e.g., from Intel® Dynamic Turbo mode or the like) without shutting down for the duration prescribed by the Hybrid Power Boost/Narrow Voltage Direct Current (NVDC) system and/or adapter protection circuitry on the platform of mobile device 101. For example, prior art voltage adapters may shut down in response to a power pulse or spike exceeding a maximum output of the voltage adapter (e.g., and therefore prior art voltage adapters may be designed for a maximum possible demand from the platform it supports, as discussed).

In order to limit the size of voltage adapter 102 as discussed herein, during a power pulse from mobile device 102 or system power pulse (e.g., a power spike) exceeding the capability of power voltage adapter 102 (e.g., a maximum output of voltage adapter 102), adapter output power protection controller 206 (e.g., an adapter controller) may limit the maximum output current of a DC/DC converter (e.g., a limit on the transformer of the output stage) of power voltage adapter 102). In another embodiment, adapter output power protection controller 206 (e.g., the adapter controller) may control a DC/DC converter of power voltage adapter 102 as a constant power source.

As a result of this mode of operation (e.g., either constant power or constant current), the output voltage of the adapter will droop. For example, adapter output power protection controller 206 of voltage adapter 102 may allow the output voltage of voltage adapter 102 to droop. As discussed, this new mode of operation (e.g., either constant power or constant current) for voltage adapter 102 may be allowed to lower or decrease the physical size of voltage adapter 102.

For example, as shown in FIG. 2, input rectifier 202 of power adapter circuitry 200 may receive AC input 201. AC input 201 may be any suitable AC input such as a mains input. In some examples, AC input 201 may be provided from a wall outlet or the like. For example, AC input 201 may have a voltage of 120V and a frequency of 60 Hz or a voltage of 230V and a frequency of 50 Hz or the like. Input rectifier 202 may convert AC input 201 to a direct current (DC), which may be provided to power smoothing capacitor 203. For example, the DC provided to power smoothing capacitor 203 may be unsmoothed DC. Power smoothing capacitor 203 may provide for a smoothing or filtering of the unsmoothed DC and power smoothing capacitor 203 may provide the smoothed DC to switch and transformer 204. For example, switch and transformer 204 may include a switch and a transformer coupled to the switch. Switch and transformer 204 may receive the smoothed DC and, along with output rectifier 205 coupled to the transformer of switch and transformer 204, may provide a voltage conversion of the smoothed DC. For example, the switch of switch and transformer 204 may switch the smoothed DC on and off at a high frequency such that the transform of switch and transformer 204 may transform the DC to a lower effective voltage based on the switching frequency. The output DC voltage may be based on a duty cycle of switch and transformer 204, a pulse width modulation implemented via switch and transformer 204 to reduce an average effective voltage, or the like. For example, output rectifier 205 may convert the switched lower voltage output of switch and transformer 204 to an output DC. Output decoupler capacitor 207, coupled to output rectifier 205, may store charge for power fluctuations or power pulses, as discussed herein, or the like and may provide DC output 208 for use by mobile device 101 via wire 103 and coupler 107 as illustrated in FIG. 1.

In some examples, adapter output power protection controller 206 may control DC output 208 via control of the switch of switch and transformer 204 and/or output rectifier 205. Furthermore, as discussed, voltage adapter 102 may have a maximum output including a maximum power, for example. In instances when a draw or demand from mobile device 101 is below the maximum output of voltage adapter 102, adapter output power protection controller 206 may operate voltage adapter 102 (via switch and transformer 204 and/or output rectifier 205) to maintain a constant voltage (e.g., the effective operating voltage of voltage adapter 102). As discussed, in order to support mobile device 101, voltage adapter 102 may also need to support power pulses or spikes associated with the operation of mobile device 101 including a turbo boost or power boost or the like. In such instances, adapter output power protection controller 206 may operate voltage adapter 102 to maintain a constant power or a constant current. During the duration of such instances, the voltage of voltage adapter 102 may droop as discussed. During such a droop, in some examples, mobile device 101 may be partially powered by a local battery and/or the performance of mobile device 101 may be reduced, or the like. In other examples, such a droop may be managed by mobile device 101 such that mobile device 101 may limit the duration and frequency of power pulses or spikes (and thereby limit any droops from voltage adapter 102) as is discussed further herein.

In some examples, input rectifier 202 may receive AC input 201 and convert AC input 201 to DC, as discussed. A DC-DC converter (e.g., including switch and transformer 204 and output rectifier 205 or switch and transformer 204, output rectifier 205, and output decoupler capacitor 207, or other similar circuitry) may convert the DC to an output DC having a lower voltage. The output of the DC-DC converter may be via output decoupler capacitor 207 as shown in FIG. 2. In such examples, adapter output power protection controller 206 may be coupled to the DC-DC converter and adapter output power protection controller 206 may control DC output 208 via control of the DC-DC converter. In instances when a draw or demand from mobile device 101 is below the maximum output of voltage adapter 102, adapter output power protection controller 206 may operate voltage adapter 102 (via the DC-DC converter as discussed) to maintain a constant voltage (e.g., the effective operating voltage of voltage adapter 102). In instances of a power pulse or spike from mobile device 101, adapter output power protection controller 206 may operate voltage adapter 102 (e.g., via the DC-DC converter) to maintain a constant power or a constant current. During the duration of such instances, the voltage of voltage adapter 102 may droop as discussed and during such a droop, in some examples, mobile device 101 may be partially powered by a local battery and/or the performance of mobile device 101 may be reduced or, in other examples, mobile device 101 may manage such a droop such that mobile device 101 may limit the duration and frequency of power pulses or spikes as is discussed further herein.

Figure 3:
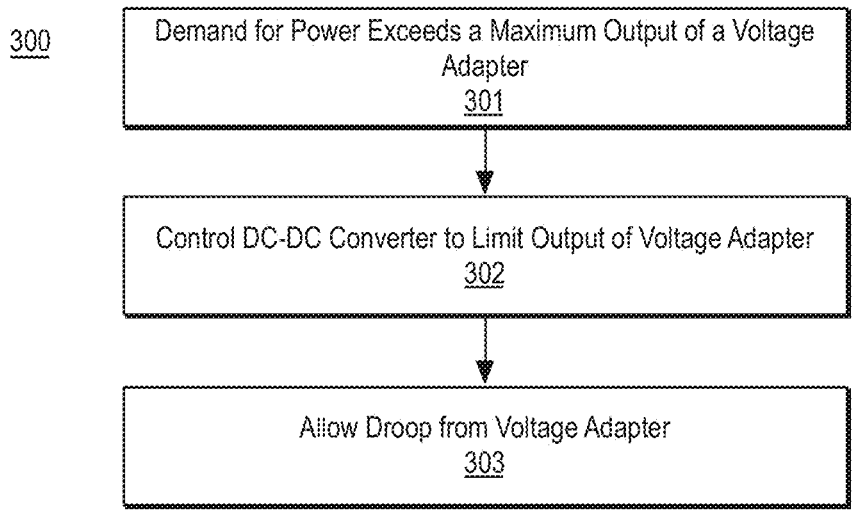
FIG. 3 is a flow diagram illustrating an example process for providing power from a voltage adapter.

FIG. 3 is a flow diagram illustrating an example process 300 for providing power from a voltage adapter, arranged in accordance with at least some implementations of the present disclosure. Process 300 may include one or more operations 301-303 as illustrated in FIG. 3. By way of non-limiting example, process 300 may form at least part of a process for providing power from voltage adapter 102 to mobile device 101 as discussed herein.

Process 300 may begin at operation 301, "Demand for Power Exceeds a Maximum Output of a Voltage Adapter", where a demand for power may exceed a maximum output of a voltage adapter. For example, due to a power pulse, power boost, or power spike, mobile device 101 may demand power exceeding a maximum output of voltage adapter 102. Voltage adapter 102 may have any suitable maximum output. For example, voltage adapter 102 may have a maximum output of 12 W, 20 W, or the like. Furthermore, in some examples, voltage adapter 102 may have a maximum output based at least in part on a battery and/or a platform of mobile device 101. In some examples, voltage adapter 102 may have a maximum output based on an average usage of mobile device. In other examples, voltage adapter 102 may have a maximum output based on a rating or storage capacity or the like of the battery of mobile device 101. Furthermore, the demand for additional power may be due to any suitable power pulse or boost or spike, such as a power pulse based on a demand for an increased frequency of a CPU of mobile device 101 or the like. The power pulse may be of any duration.

Process 300 may continue at operation 302, "Control DC-DC Converter to Limit Output of Voltage Adapter", where a DC-DC converter may be controlled to limit the output of the voltage adapter. For example, adapter output power protection controller 206 may control the DC-DC converter to provide a constant current or constant power output from voltage adapter 201 via various components of power adapter circuitry 200. In some examples, DC-DC converter may include switch and transformer 204 and controlling the DC-DC converter may include controlling a duty cycle or the like of switch and transformer 204.

Process 300 may continue at operation 303, "Allow Droop from Voltage Adapter", where the voltage adapter may be allowed to have a voltage droop. For example, as discussed, adapter output power protection controller 206 may control voltage adapter 102 to provide a constant current or constant power during a power pulse demanding power exceeding a maximum output of voltage adapter 102. During such an episode, the voltage of voltage adapter 102 may be allowed to droop via adapter output power protection controller 206.

Figure 4:
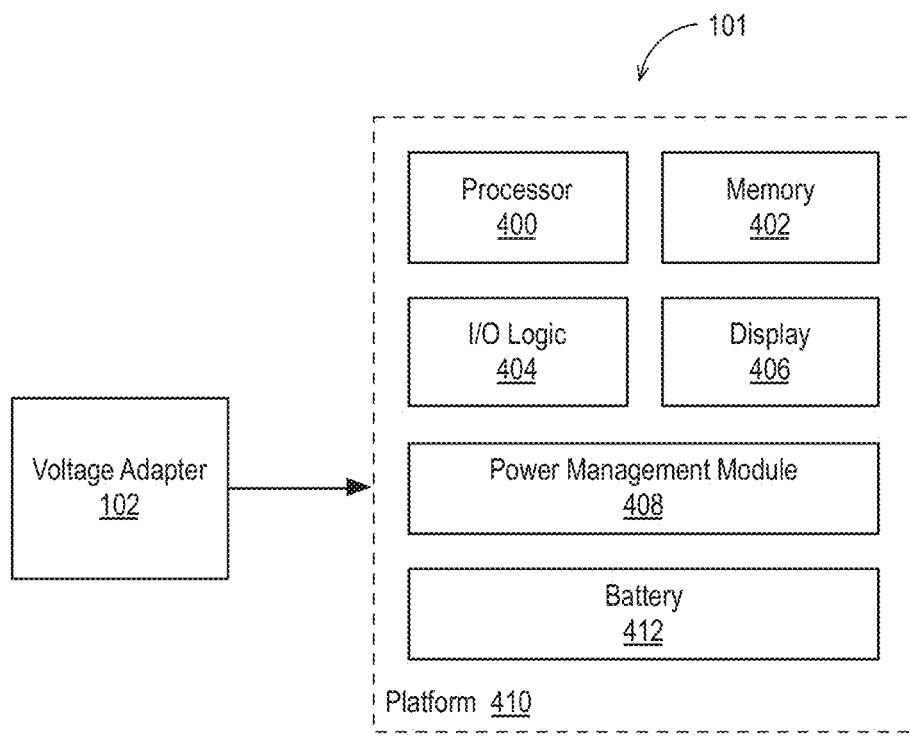
FIG. 4 is an illustrative block diagram of an example mobile device platform.

FIG. 4 is an illustrative block diagram of an example mobile device platform 410, arranged in accordance with at least some implementations of the present disclosure. For example, mobile device platform 410 may provide a platform for mobile device 101 (e.g., a laptop, tablet, smartphone, etc.) that may have, use, or implement a user friendly and small power adapter such as voltage adapter 102 as discussed herein. As shown in FIG. 4, mobile device platform 410 may include a processor 400 that may have several integrated logic units, such as execution units, retirement units, cache memories, memory controller(s), etc. Mobile platform 410 may also include one or more memories 402 that may comprise volatile, non-volatile, or a combination of both types of memories. Additionally, mobile platform 410 may include an I/O logic 404 that may be configured to allow mobile device 101 to interact with other devices and with users. For example, I/O logic 404 may include one or more I/O adapters that translate and transfer data into and out of the system of mobile device 101 (e.g., mobile device platform 410). Mobile device platform 410 may also include a display 406 to allow visual and, in some examples, touch interaction with a user of mobile device 101. Furthermore, mobile device platform 410 may include a battery 412 which may include any suitable battery such as a rechargeable lithium-ion battery or the like. Also, mobile device platform 410 may include a power management module 408, which may be implemented via processor 400 and/or memory 402 or other resources of platform 410. For example, memory 402 may be configured to store power management data and power management module 408 (e.g., as implemented via a central processing unit such as processor 400) may be configured to implement power boost operations and/or restrict use of power boost operations as discussed with respect to process 500 or elsewhere herein. In some examples, power management module 408 may be implemented via software, firmware, hardware, or a combination thereof. As shown, mobile device 101 may be powered by voltage adapter 102, battery 412, or a combination of both.

As discussed, mobile device platform 410 may accommodate the use of voltage adapter 102. In some examples, mobile device platform 410 may provide, during a droop from voltage adapter 102, supplemented power from battery 412 and/or reduced performance (e.g., reduced operating frequency) of processor 400 as is discussed further herein with respect to FIGS. 18-20. In such examples, the response of mobile device platform 410 (e.g., supplemental power from battery 412 and/or reduced performance) may take a certain duration to be implemented such as 1 to 5 milliseconds or the like. During such a duration, power adapter 102 may experience a droop that does not impact the performance of platform 410. For example, output decoupler capacitor 207 (please refer to FIG. 2) may mitigate the droop during its discharge. Output decoupler capacitor 207 may therefore be implemented or selected based on a predetermined (and acceptable) droop and an expected (and acceptable) droop duration. For example, output decoupler capacitor 207 may be selected to mitigate a droop for about 1 to 5 milliseconds based on a demand for power on voltage adapter 102 exceeding a maximum output of voltage adapter by a predetermined amount such as 1 to 3 Watts or the like.

In other examples, power management module 408 may manage platform 410 to implement voltage adapter 102 having a known or predetermined voltage droop or the like. For example, power management module 408 may limit power pulses allowed by platform 410 based on the duration of power pulses or frequency of power pulses or both. For example, power management module 408 may implement a power management strategy via software, firmware, or hardware to limit power pulses. In an embodiment, power management module 408 may implement the power management plan via a basic input/output system (BIOS) of platform 410.

For example, platform 410 may be able to tolerate a certain duration and/or amount of droop from voltage adapter 102 either before a power management adjustment is made via platform 410 or based on no battery power being available to platform 410 or the like. For example, if battery 412 is dead or unavailable for supplemental power to platform 410, power management module 408 may limit power pulses to, for example, 3, 4, 5, or 10 milliseconds, or the like. For example, a power boost operation of platform 410 may be limited to a duration not greater than a maximum power boost duration associated with voltage adapter 102. Such a duration may correspond to a useful discharge duration of output decoupler capacitor 207 of voltage adapter 102 (please refer to FIG. 2). After such a predetermined duration, the performance of platform 410 may be negatively impacted, for example. Furthermore, power management module 408 may, after a power pulse or power boost operation or the like, restrict use of another power pulse or power boost operation or the like until after at least a predetermined duration. For example, the predetermined duration may be associated with a recharge time of voltage adapter 102. In an embodiment, the predetermined duration may be associated with a recharge time of output decoupler capacitor 207 of voltage adapter 102. Power management module 408 may, after the predetermined duration, again allow power pulse or power boost operations for a duration less than the maximum power boost duration as discussed.

Power management module 408 may implement such power pulse or power boost operations in any suitable manner. For example, power management module 408 may assert power pulse or power boost disable and/or enable bits to restrict power boost operations and/or their durations and/or power management module 408 provide system settings or the like to implement the duration and frequency limitations on power boost operations.

Figure 5:
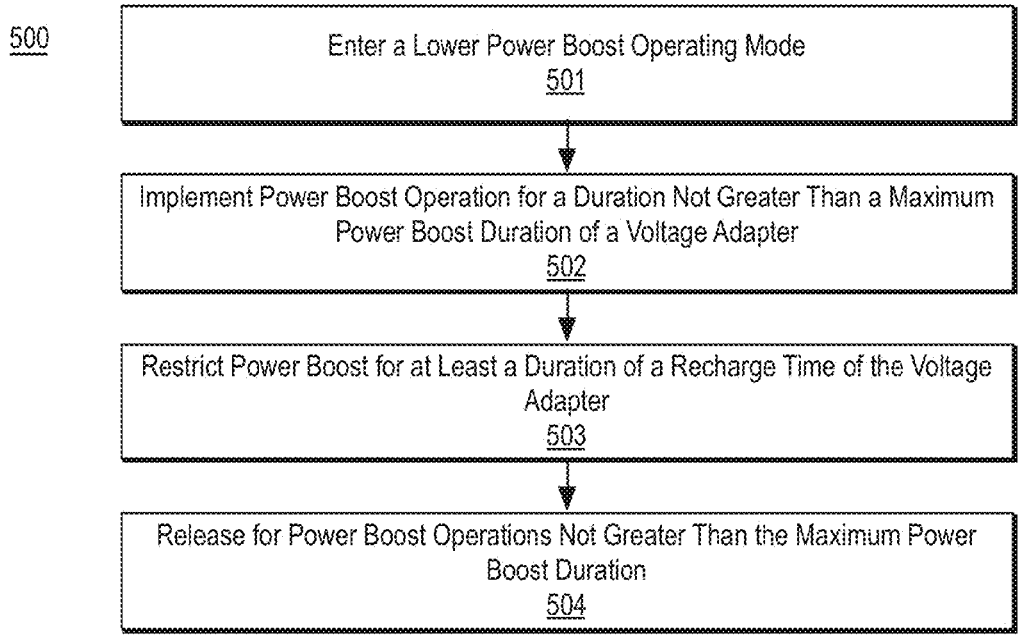
FIG. 5 is a flow diagram illustrating an example process for managing power from a voltage adapter.

FIG. 5 is a flow diagram illustrating an example process 500 for managing power from a voltage adapter, arranged in accordance with at least some implementations of the present disclosure. Process 500 may include one or more operations 501-504 as illustrated in FIG. 5. By way of non-limiting example, process 500 may form at least part of a process for managing power implemented via mobile device 101 as discussed herein.

Process 500 may begin at operation 501, "Enter a Lower Power Boost Operating Mode", where a mobile device may enter a lower power boost operating mode. For example, mobile device 101 may enter a lower power boost operating mode in response to detecting battery 412 is dead or not available or the like. In some examples, mobile device 101 may remain in a standard power boost operating mode when battery 412 is available such that any voltage droops from voltage adapter 102 may be mitigated by mobile device 101 supplementing power with battery 412 or the like. In some examples, operation 501 may be optional as mobile device 101 may manage power from voltage adapter 102 as discussed with respect to operations 502-504 during normal operation of mobile device 101.

Process 500 may continue at operation 502, "Implement Power Boost Operation for a Duration Not Greater Than a Maximum Power Boost Duration of a Voltage Adapter", where a power boost operation may be implemented for a duration not greater than a maximum power boost duration of a voltage adapter. For example, mobile device 101 may implement a power boost operation that demands a power pulse or spike or the like that is above a maximum output of voltage adapter 102 or above a standard or predetermined output of voltage adapter 102 or the like. Power management module 408 may limit a duration of the power boost operation to a duration less than a maximum power boost duration of voltage adapter 102. For example, the maximum power boost duration may be based on a predetermined design rule for voltage adapter 102 and/or mobile device 101, based on mobile device 101 detecting one or more characteristics of voltage adapter 102, or the like. In some examples, the maximum power boost duration may be associated with output decoupler capacitor 207 of voltage adapter 102. For example, the maximum power boost duration may be associated with a discharge of output decoupler capacitor 207. In an embodiment, the maximum power boost duration is 5 milliseconds; however any suitable duration may be implemented.

Process 500 may continue at operation 503, "Restrict Power Boost Operations for at Least a Duration of a Recharge Time of the Voltage Adapter", where power boost operations may be restricted or eliminated for at least a duration of a recharge time of the voltage adapter. For example, mobile device 101 may, after the power boost operation implemented at operation 502, restrict and/or eliminate power boost operations for a duration such that voltage adapter 102 may recharge in preparation for a subsequent power boost operation (if any). Power management module 408 may restrict and/or eliminate power boost operations for at least a duration of a recharge time as discussed. As with the maximum power boost duration, the recharge duration may be based on a predetermined design rule of voltage adapter 102 and/or mobile device 101, based on mobile device 101 detecting one or more characteristics of voltage adapter 102, or the like. In some examples, the recharge time may be associated with output decoupler capacitor 207 of voltage adapter 102. For example, the recharge time may be associated with a full or partial recharge time of output decoupler capacitor 207. In an embodiment, the recharge time is 100 milliseconds; however any suitable duration may be implemented.

Process 500 may continue at operation 504, "Release for Power Boost Operations Not Greater Than the Maximum Power Boost Duration", where power boost operations may be released or allowed such that the power boost operation(s) are not greater than the maximum power boost duration. For example, subsequent to release at operation 504, power boost operations may implemented as discussed with respect to operation 502 such that any power boost operations are for a duration not greater than a maximum power boost duration of the voltage adapter as discussed. Furthermore, operations 502-504 (and, optionally, operation 501) of process 500 may be performed any number of times during operation of the mobile device. Such operations may allow for power boosts for mobile device 101 while enabling a small form factor voltage adapter as discussed herein.

As discussed, a voltage droop from voltage adapter 102 may be allowed and/or managed by a platform such as platform 410 or other platforms as discussed herein. In order to test the effects of droop on platform operation such as the operation of platform 410 or the like, a test system was subjected to a train of voltage droops.

Figure 6:
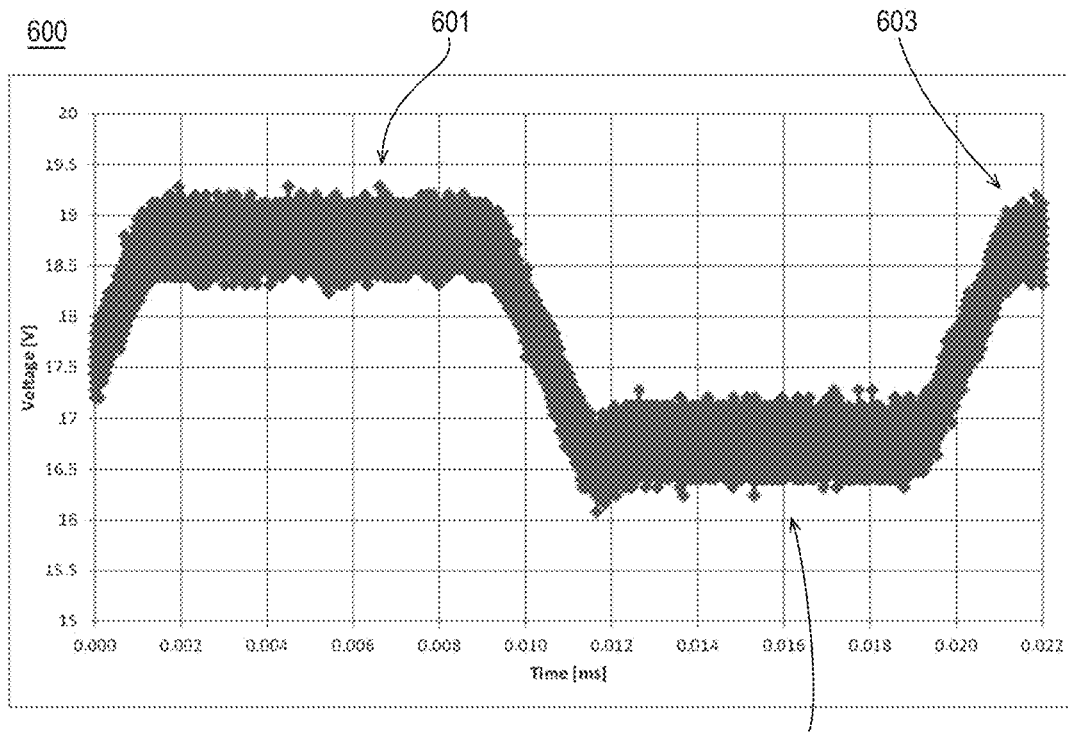
FIG. 6 illustrates an example platform input voltage.

FIG. 6 illustrates an example platform input voltage 600, arranged in accordance with at least some implementations of the present disclosure. As shown in FIG. 6, platform input voltage 600 was drooped from a level 601 of about 19V to a level 602 of about 17V in about 1.8 ms and then was raised back to a level 603 of about 19V.

Figure 7:
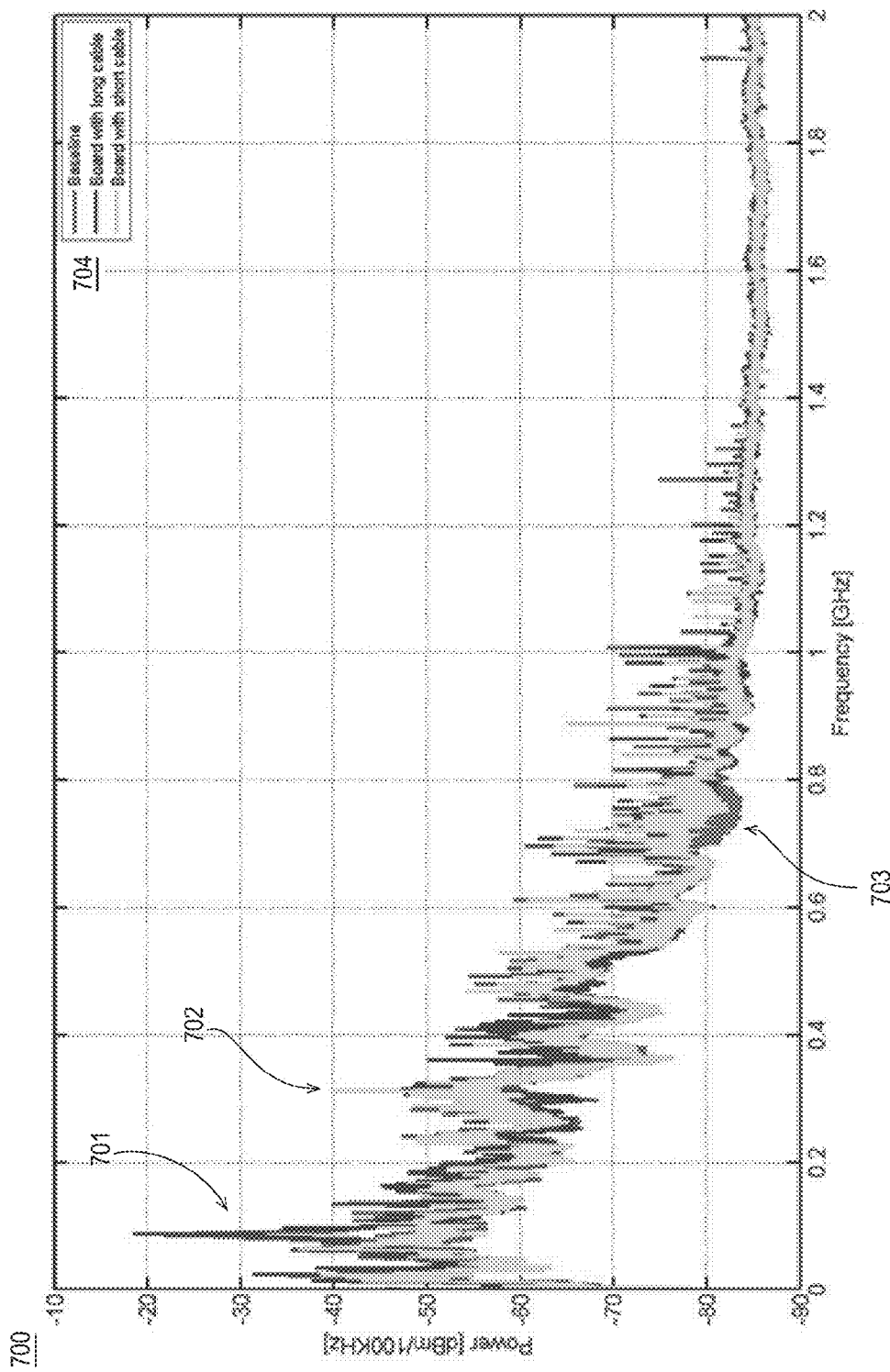
FIG. 7 illustrates an example of measured radiated electromagnetic induction (EMI) with and without voltage droops.

FIG. 7 illustrates an example of measured radiated electromagnetic induction (EMI) 700 with and without voltage droops, arranged in accordance with at least some implementations of the present disclosure. As illustrated in FIG. 7, curve 703 shows the radiated EMI for constant input voltage (e.g., the baseline in key 704), curve 701 shows the EMI with the voltage droops and with long unshielded wires from the power supply (e.g., board with long cable in key 704), and curve 702 shows the EMI with the voltage droops and short leads from the power supply (e.g., board with long cable in key 704). As illustrated, curves 701-703 illustrate there is little difference in the radiated EMI between the reference case (curve 703) and the case where input voltage has a droop and the wires are short (curve 702) and even when the wires are long (curve 701). For example, curves 701, 702, 703 are substantially matched. These results shows that the voltage droops in the input voltage (please refer to FIG. 6) will unlikely produce high radiated EMI in platform 410 of mobile device 101. This experiment was conducted on a test platform with Hybrid Boost Power (HPB) and a relatively large input capacitance. A platform with Narrow Voltage Direct Current (NVDC) would have less input decoupling and thus will have even less radiated EMI noise.

Figure 8:
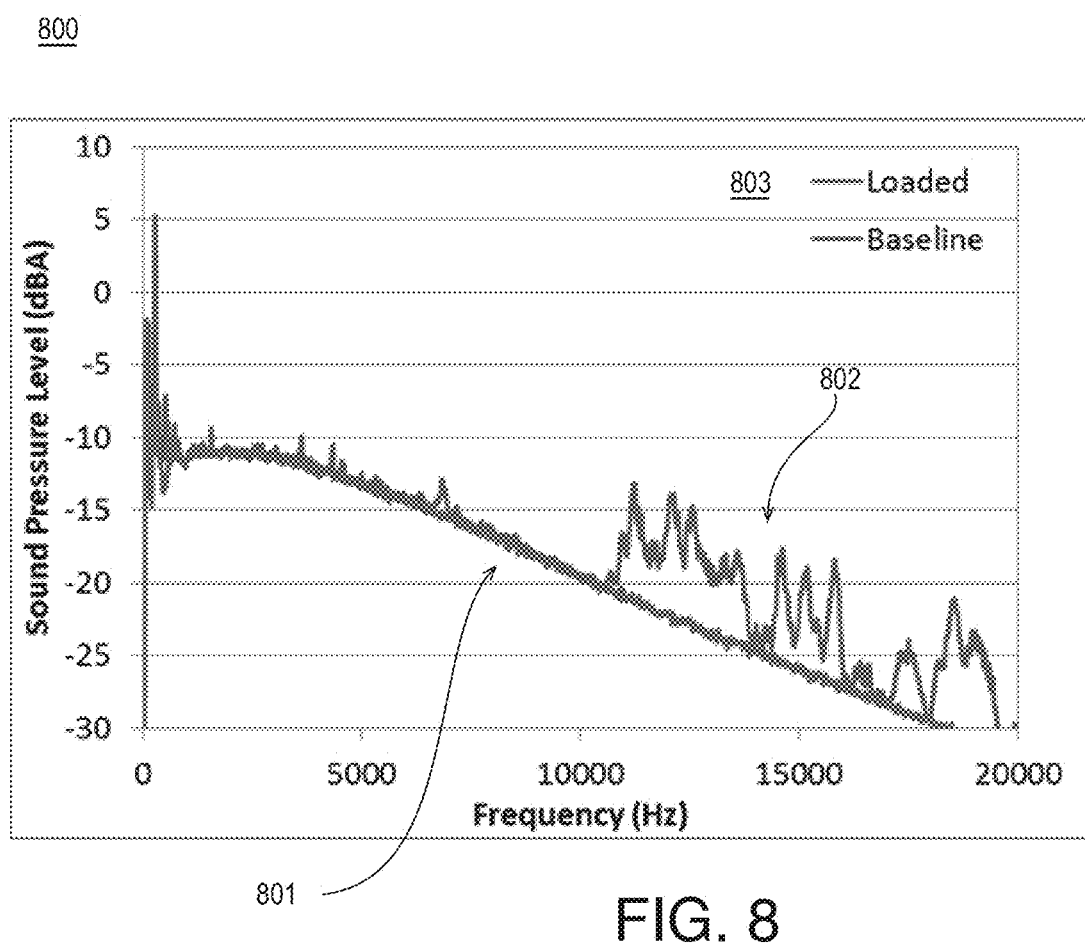
FIG. 8 illustrates an example of audio noise with and without voltage droops.

FIG. 8 illustrates an example of audio noise 800 with and without voltage droops, arranged in accordance with at least some implementations of the present disclosure. As illustrated in FIG. 7, curve 801 shows the audio noise for constant input voltage (e.g. the baseline in key 803) and curve 802 shows the audio noise with the voltage droops (e.g., the loaded indication in key 803). For example, at most frequencies, curve 801 and curve 802 substantially match except for some deviation between frequencies 10,000 Hz and 20,000 Hz where curve 802 has increased sound pressure levels over curve 801. However, such deviations are small and may not be perceptible by a human ear. For example, as shown in FIG. 8, the audio noise induced by the voltage droop was very small and could not be heard by a human ear.

The tests illustrated by FIGS. 7 and 8 demonstrate that the adapter size (e.g., form factor of voltage adapter 102) may be lowered and, if the adapter output voltage (e.g., DC output 208) is allowed to droop in implementing the smaller form factor voltage adapter 102, such a droop is unlikely to cause any issues to the mobile platform (e.g. platform 410 of mobile device 101).

Figure 9:
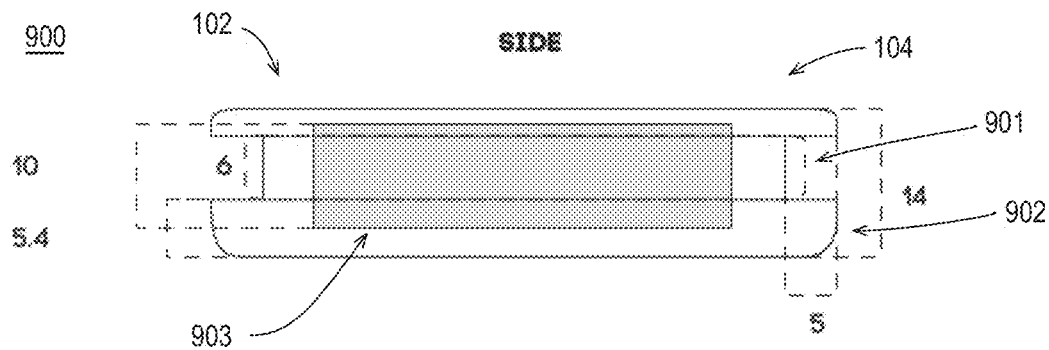
FIG. 9 illustrates an example side view of an example voltage adapter.
Figure 10:
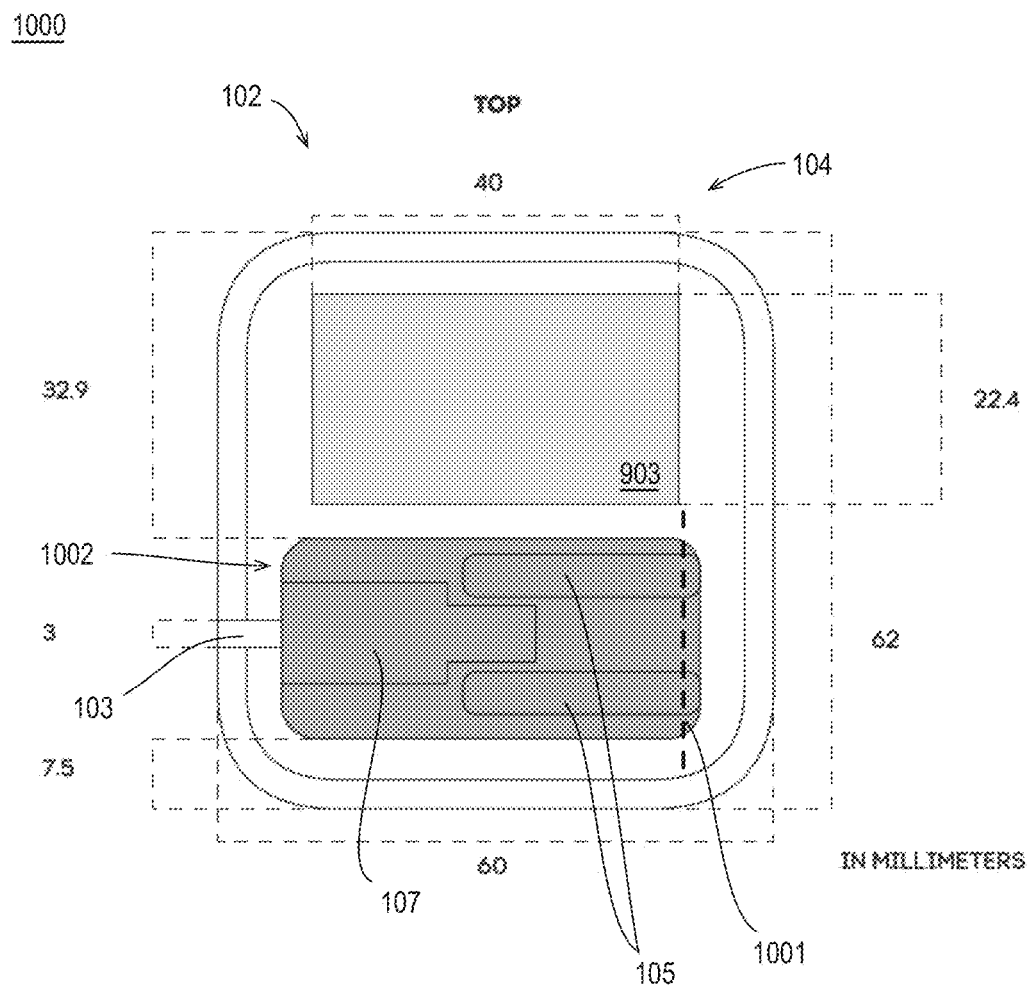
FIG. 10 illustrates an example top view of an example voltage adapter.

As discussed, the described voltage adapter 102 may be implemented in a small form factor package. FIGS. 9-17 illustrate embodiments of a form factor of voltage adapter 102 including 2D schematics, 3D views, and mock-up models. Furthermore, FIGS. 9 and 10 show measurements in millimeters (mm) of one embodiment of voltage adapter 102. FIGS. 9-17 illustrate voltage adapter 102 may house (e.g., when not in use) wires (e.g., wire 103; please refer to FIG. 1), which are used to connect voltage adapter 102 to a system such as mobile device 102. Wire 103 may be circular, as in traditional adapters, or flat in order to accommodate the form factor of exemplary voltage adapter 102. In some embodiments, the connector (e.g. coupler 107) to the system such as mobile device 101 may be housed (e.g., when not in use) in a special hole or groove in voltage adapter 102 with an internal magnet to keep coupler 108 in place when not in use (e.g., when a user is storing or carrying the adapter or the like). The length of wire 103 may be relatively short in some embodiments because voltage adapter 102 (e.g., the travel adapter) may be used for an overnight charge. Furthermore, the use external wires of may extend the length between mobile device 101 and a source of AC input 201 (e.g., a wall outlet or the like).

Embodiments of the form factor shown in FIGS. 9-17 may also contain the space for AC prongs 105 (please refer to FIG. 1), which may be extruded or extended to connect to an AC outlet such as a wall outlet or the like. Furthermore, the embodiments of FIGS. 9-17 may have AC prongs 105 extend via pivoting around an axis near an edge of housing 104. Such a design may provide for AC prongs 105 located such that voltage adapter 102 may be oriented to not obscure other unused outlets (e.g., AC prongs 105 may be inserted such that housing 104 extend away from other outlets in multi-outlet settings). Such a design may leave other outlets available for plugs from the devices of fellow travelers or the like. The design illustrated in FIGS. 9-17 is very small and convenient for users to carry and, for example, can easily fit in someone's pocket. Furthermore, as used herein and in the following discussion, terms such as top, bottom, length, width, depth and the like are used for convenience and not to designate a preferred orientation of the embodiments.

FIG. 9 illustrates an example side view 900 of example voltage adapter 102, arranged in accordance with at least some implementations of the present disclosure. In FIGS. 9 and 10 (as discussed below), example measurements are provided. Such measurements provide for details of an exemplary voltage adapter; however, the embodiments discussed herein are not limited to such example measurements. As shown in FIG. 9, voltage adapter 102 may have a housing 104 with an exterior groove 901. For example, exterior groove 901 may be around the exterior sides of housing 104. Exterior groove 901 may be provided for storing wire 103 (please refer to FIG. 1) when not in use. For example, when in use, wire 103 may extend to mobile device 101 and, when not in use, wire 103 may be housed in exterior groove 901. As shown, in an embodiment, housing 104 may have an overall thickness of 14 mm and exterior groove 901 may have a depth of 5 mm and a width of 6 mm. Furthermore, a bottom lip or ridge 902 of housing 104 may have a width of 5.4 mm. As also shown in FIG. 9, voltage adapter 102 may include a region 903. Region 903 may include components of voltage adapter such as, for example, input rectifier 202, power smoothing capacitor 203, switch and transform 204, output rectifier 205, adapter output power protection controller 206, and/or output decoupler capacitor 207. In some examples, region 903 may include input rectifier 202, power smoothing capacitor 203, a DC-DC converter as discussed (including, for example, switch and transformer 204 and/or output rectifier 205 and/or output decoupler capacitor 207 or similar circuitry), and/or adapter output power protection controller 206. In other examples, region 903 may include a DC-DC converter and/or other circuitry. In an embodiment, region 903 has a depth of 10 mm as shown in FIG. 9.

FIG. 10 illustrates an example top view 1000 of example voltage adapter 102, arranged in accordance with at least some implementations of the present disclosure. As shown in FIG. 9, voltage adapter 102 may include AC prongs 105. AC prongs 105 may pivot about an axis 1001 between an enclosed position (as shown) within housing 104 to an extended position (e.g., around axis 1001 to a vertical position with respect to housing 104—such a position would be extending out of the page in FIG. 10 for example). In the extended position, a portion or all of AC prongs 105 may be outside of housing 104 such that AC prongs 105 may be inserted into a wall outlet or the like. Furthermore, voltage adapter 102 may include coupler 107. Coupler 107 may be inserted (e.g., when not in use) into a groove of housing 104, as shown in, for example, FIG. 13. Furthermore, voltage adapter 102 may include a magnet in housing 104 to hold coupler 107 in place when not in use. As shown, AC prongs 105 and/or coupler 107 (when not in use) may be within a region 1002 of housing 104 of voltage adapter 102. Furthermore, region 903, as discussed with respect to FIG. 9, may be adjacent to region 1002.

As illustrated in FIG. 10, housing 104 may have an overall width of 60 mm and an overall length of 62 mm. For example, such dimensions along with an overall depth of 14 mm as discussed with respect to FIG. 9 may provide a small form factor power adapter. Also as shown in FIG. 10, region 903 may have a width of 40 mm and a length of 22.4 mm and region 1002 may have a width slightly greater than the width of region 903 and a length of 21.6 such that a length from the top edge of region 1002 to the top edge of housing 104 is 32.9 mm and a length from the bottom edge of region 1002 to the bottom edge of housing 104 is 7.5 mm. Furthermore, wire 103 may have a width or diameter or the like of 3 mm or just under 3 mm.

Figure 11:
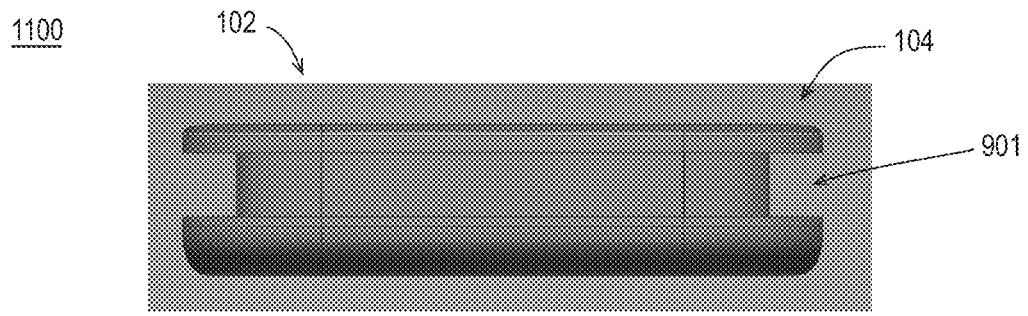
FIG. 11 illustrates an example side view of an example voltage adapter.

FIG. 11 illustrates an example side view 1100 of example voltage adapter 102, arranged in accordance with at least some implementations of the present disclosure. As shown in FIG. 11, housing 104 of voltage adapter 102 may include exterior groove 901 for housing wire 103 when wire 103 is not in use.

Figure 12:
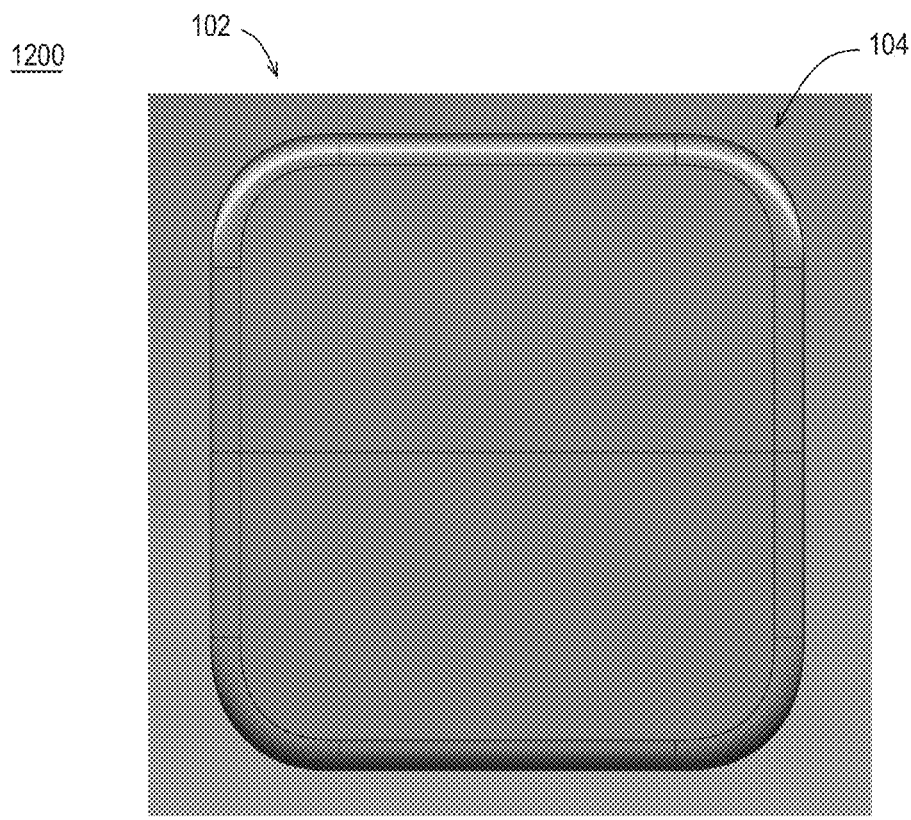
FIG. 12 illustrates an example back view of an example voltage adapter.

FIG. 12 illustrates an example back view 1200 of example voltage adapter 102, arranged in accordance with at least some implementations of the present disclosure. As shown in FIG. 12, voltage adapter 102 may include housing 104 for housing the various discussed components, AC prongs 105 when in an enclosed position, and wire 103 having coupler 107 when not in use in a clean, small form factor device.

Figure 13:
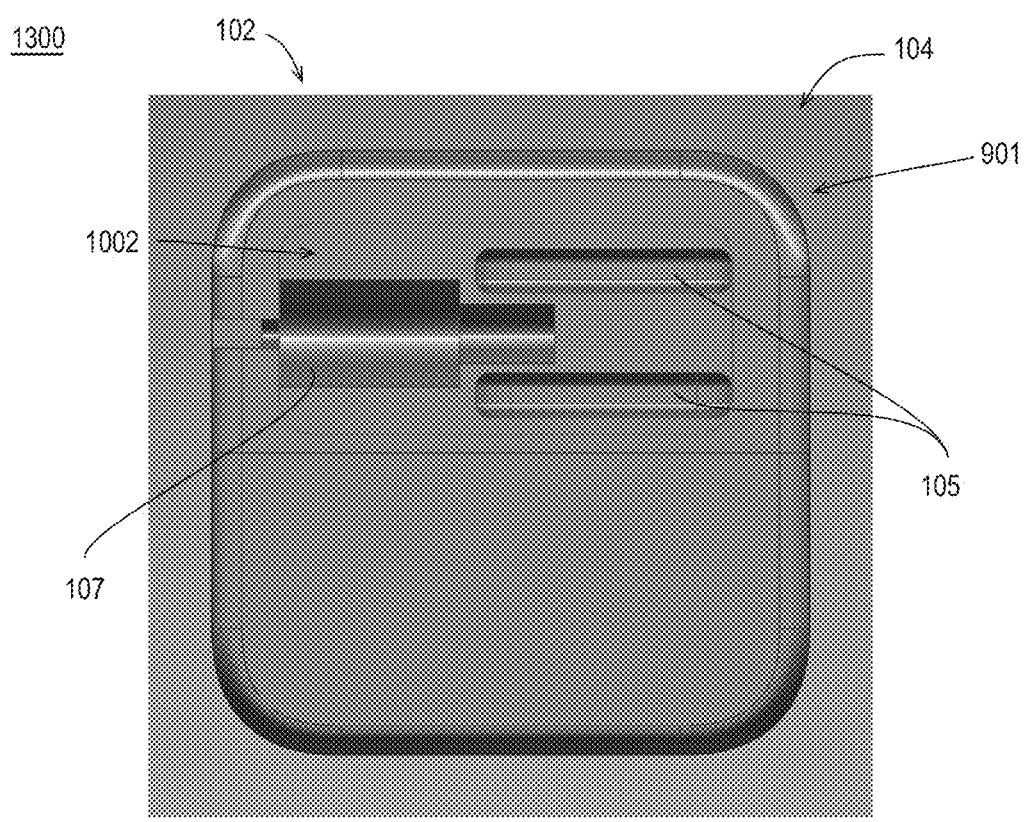
FIG. 13 illustrates an example top view of an example voltage adapter.

FIG. 13 illustrates an example top view 1300 of example voltage adapter 102, arranged in accordance with at least some implementations of the present disclosure. As shown in FIG. 13, housing 104 of voltage adapter 102 may include AC prongs 105 within housing 104 when in an enclosed position and coupler 107 housed within housing 104 when not in use. Furthermore, FIG. 13 illustrates voltage adapter 102 may include AC prongs 105 and coupler 107 (when not in use) within region 1002 of housing 104.

Figure 14:
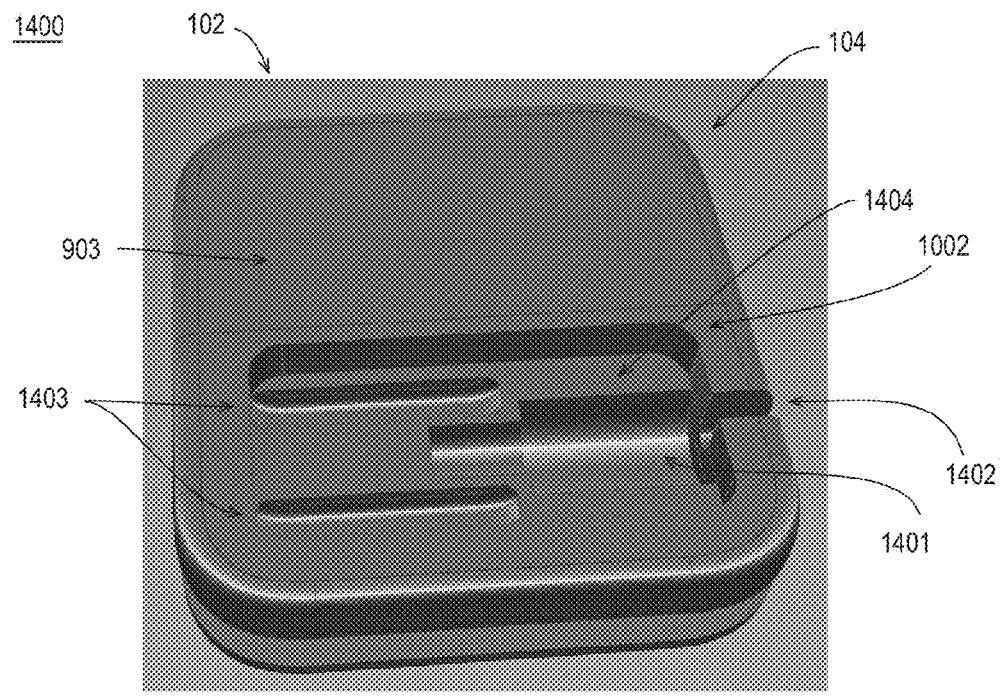
FIG. 14 illustrates an example top view at an angle of an example voltage adapter.

FIG. 14 illustrates an example top view at an angle 1400 of example voltage adapter 102, arranged in accordance with at least some implementations of the present disclosure. As shown in FIG. 14, housing 104 of voltage adapter 102 may include a groove 1401 for receiving coupler 107 and/or an opening 1402 for the passage of wire 103. For example, wire 103 may be placed through opening 1402 and coupler 107 may be inserted into groove 1401 when wire 103 and coupler 107 are not in use. Furthermore, FIG. 14 illustrates housing 104 may include grooves 1403 for AC prongs 105. For example, grooves 1403 may facilitate the retraction of AC prongs 105 into the enclosed position such that AC prongs 105 may be retracted to a position within housing 104 as discussed herein. FIG. 14 also illustrates region 102 may include a recessed area 1404 (e.g., recessed below a top surface of housing 104) including grooves 1401 and 1403 and that region 1002 may be adjacent to region 903 as discussed herein.

Figure 15:
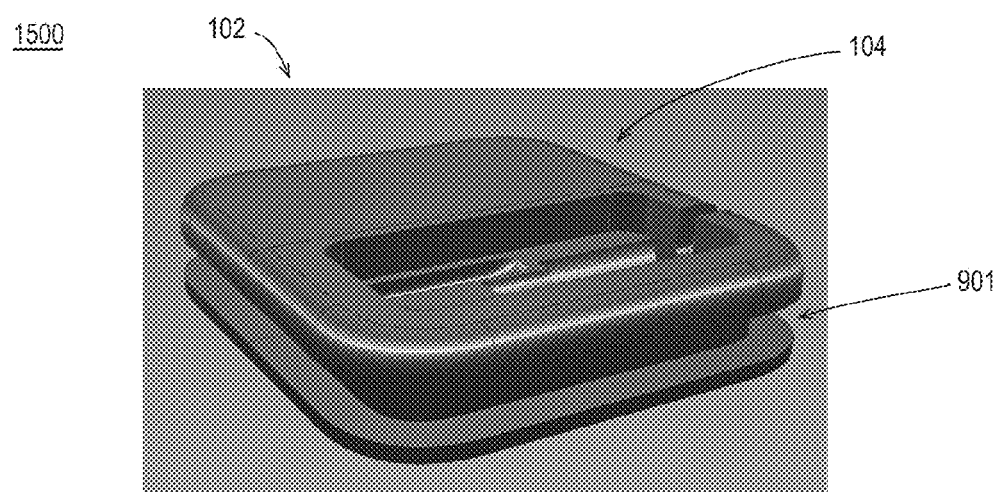
FIG. 15 illustrates an example top view at an angle of an example voltage adapter.

FIG. 15 illustrates an example top view at an angle 1500 of example voltage adapter 102, arranged in accordance with at least some implementations of the present disclosure. FIG. 15 illustrates the discussed portions of housing 104 of voltage adapter 102, which will not be repeated for the sake of brevity. In particular, FIG. 15 illustrates exterior groove 901 of housing 104 for storing wire 103 as discussed herein.

Figure 16:
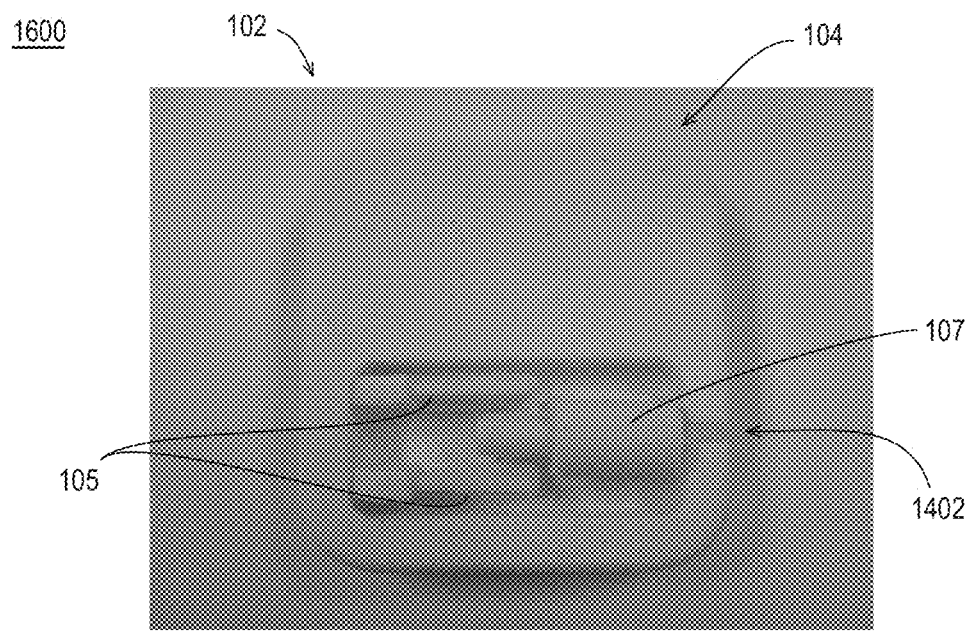
FIG. 16 illustrates an example mock up of an example voltage adapter.

FIG. 16 illustrates an example mock up 1600 of example voltage adapter 102, arranged in accordance with at least some implementations of the present disclosure. As shown in FIG. 16, mock up 1600 includes a mock up of components as discussed herein such as housing 104, AC prongs 105, coupler 107, and opening 1402.

Figure 17:
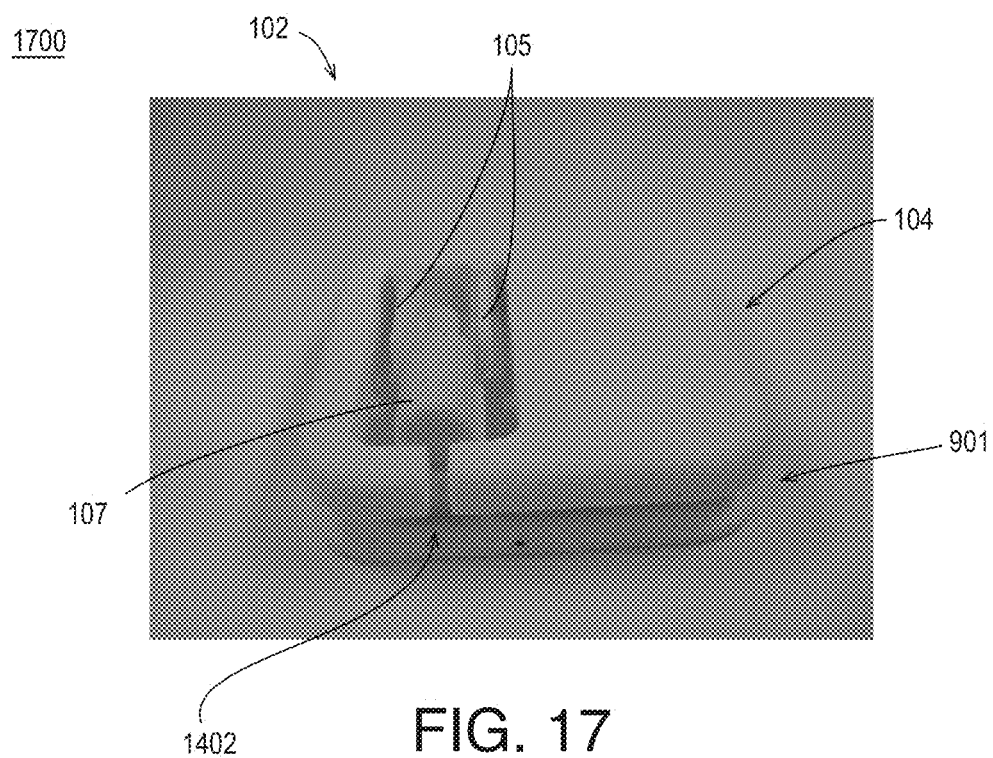
FIG. 17 illustrates an example mock up of an example voltage adapter.

FIG. 17 illustrates an example mock up 1700 an example voltage adapter 102, arranged in accordance with at least some implementations of the present disclosure. As shown in FIG. 17, mock up 1700 includes a mock up of components as discussed herein such as housing 104, AC prongs 105, coupler 107, opening 1402, and exterior groove 901.

As discussed, in order to accommodate a mode of operation with an allowable droop by voltage adapter 102, mobile device 101 (e.g., the platform of mobile device 101) may meet the requirements of voltage adapter 102 for the duration of the power pulse (e.g., power spike or Turbo spike or the like) for a given voltage droop. Such support may be provided via Hybrid Power Boost, NVDC, and/or platform current protection implemented via mobile device 101. For example, Hybrid Power Boost and/or NVDC may allow for a battery of mobile device 101 to supplement the power provided by power adapter 102. Furthermore, platforms having current protection may allow assertion of a processor hot bit (e.g., Prochot# signal) or the like to signal or to alert the CPU of mobile device 101 to lower the CPU frequency. In some examples, the timing and the power levels for these implementations may be done in accordance with the characteristics of voltage adapter 102 and the platform maximum allowable droop of mobile device 101 as is discussed further herein.

Figure 18:
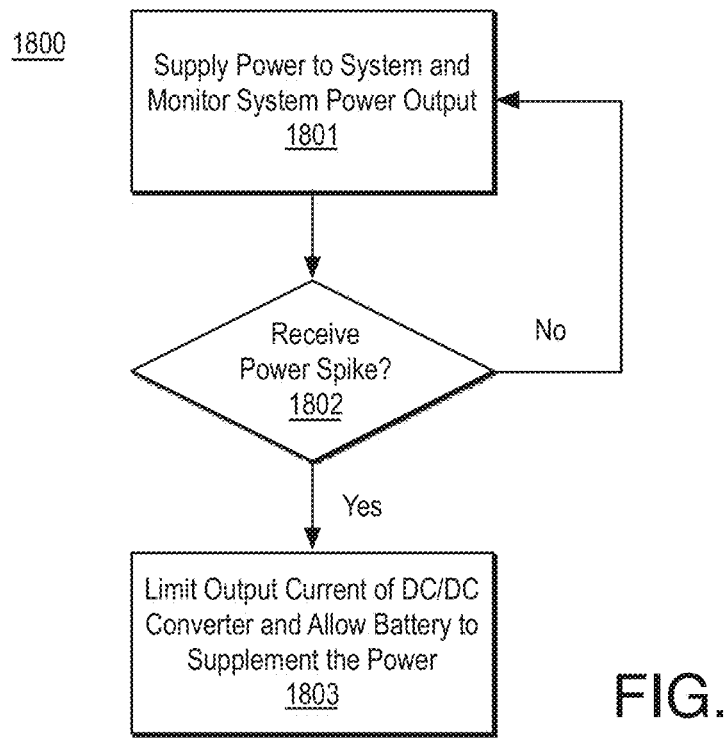
FIG. 18 is a flow diagram illustrating an example process for utilizing a voltage adapter during a power spike.

FIG. 18 is a flow diagram illustrating an example process 1800 for utilizing a voltage adapter during a power spike, arranged in accordance with at least some implementations of the present disclosure. Process 1800 may include one or more operations 1801-1803 as illustrated in FIG. 18. By way of non-limiting example, process 1800 may form at least part of a process for utilizing power adapter 102 by mobile device 101 via platform 410 and/or platform 2020 as discussed herein. Process 1800 may be performed by logic in hardware, firmware, software, or a combination of any of the above types of logic.

Figure 19:
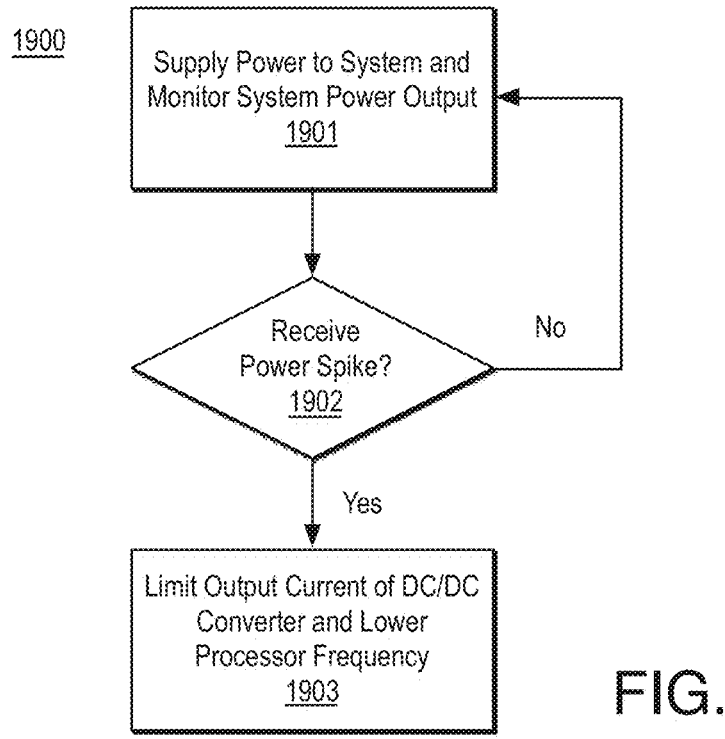
FIG. 19 is a flow diagram illustrating an example process for utilizing a voltage adapter during a power spike.

FIG. 19 is a flow diagram illustrating an example process 1900 for utilizing a voltage adapter during a power spike, arranged in accordance with at least some implementations of the present disclosure. Process 1900 may include one or more operations 1901-1903 as illustrated in FIG. 19. By way of non-limiting example, process 1900 may form at least part of a process for utilizing power adapter 102 by mobile device 101 via platform 410 and/or platform 2020 as discussed herein. Process 1900 may be performed by logic in hardware, firmware, software, or a combination of any of the above types of logic. Furthermore, processes 1800 and 1900 will be discussed with reference to mobile platform 2020 of FIG. 20.

Figure 20:
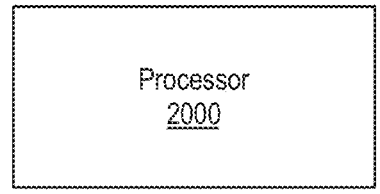
FIG. 20 is an illustrative block diagram of an example mobile platform.
Figure 20:
Figure 20:
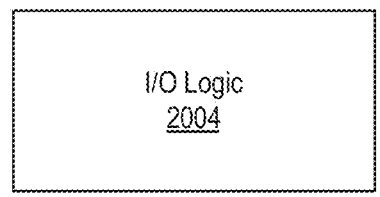
Figure 20:
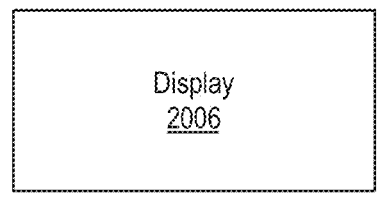
Figure 20:
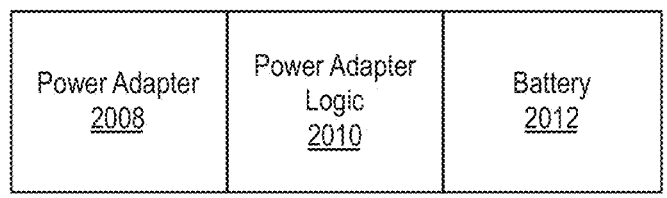

FIG. 20 is an illustrative block diagram of an example mobile platform 2020, arranged in accordance with at least some implementations of the present disclosure. For example, mobile platform 2020 may be implemented via any mobile factor device such as a laptop, a tablet, a smartphone, or the like that may have, use, or implement a user friendly and small power adapter such as voltage adapter 102 as discussed herein. As shown in FIG. 20, platform 2020 may include a processor 2000 that may have several integrated logic units, such as execution units, retirement units, cache memories, memory controller(s), or the like. Platform 2020 may also include one or more memories 2002, which may include volatile, non-volatile, or a combination of both types of memories. Additionally, platform 2020 may include I/O logic 2004 that may allow for the system implementing mobile platform 2020 to interact with other devices and with users. For example, I/O logic 2004 may include one or more I/O adapters that may translate and transfer data into and out of the system implementing platform 2020. As shown, Platform 2020 may also include a display 2006 to allow visual and potentially touch interaction with a user of platform 2020. Furthermore, platform 2020 may be powered by a power adapter 2008, a battery 2012, or a combination of both. For example, power adapter 2008 may include voltage adapter 120 as discussed herein. Furthermore, a power adapter logic 1410 may makes a determination of what is to power the system implementing mobile platform 2020 at a given time. For example, power adapter logic may include elements allowing the operation of the embodiments discussed herein.

Returning to FIG. 18, process 1800 may begin at operation 1801, "Supply Power to System and Monitor System Power Output", where processing logic such as power adapter logic 2010 may supply power to the system implementing mobile platform 2020 and power adapter logic 2010 may monitor power output of the system implementing mobile platform 2020. For example, power adapter logic 2010 may supply power to platform 2020 via power adapter 2008 and/or batter 2012 and power adapter logic 2010 may monitor mobile platform 2020.

Process 1800 may continue at decision operation 1802, "Receive Power Spike?", where processing logic such as power adapter logic 2010 may determine if a power spike is imminent or occurring. If a power spike is not occurring nor is a power spike imminent, then process 1800 may continue at operation 1801 as shown such that the processing logic such as power adapter logic 2010 may supply power to the system implementing mobile platform 2020 and power adapter logic 2010 may monitor power output of the system implementing mobile platform 2020 as discussed above.

If a power spike is occurring, process 1800 may continue at operation 1803, "Limit Output Current of DC/DC Converter and Allow Battery to Supplement the Power", where processing logic such as power adapter logic 2010 may limit the output current of power adapter 2008 via, for example, limiting the output current of a DC/DC converter in power adapter 2008 and where processing logic such as power adapter logic 2010 may allow a battery such as battery 2012 in the system implementing platform 2020 to supplement the power from power adapter 2008 to address the power spike.

The operations of process 1800 may be repeated any number of times to handle power spikes in a system implementing platform 2020. For example, process 1800 may illustrate an example of platform 2020 supplementing power to the system implementing platform 2020 via battery 2012. In such examples, voltage adapter 102 may provide power to mobile device 101 (for example) and voltage adapter 102 may be capable of supplying power sufficient to power mobile device 101 during normal operation of mobile device 101 and power adapter 102 (or mobile device 101) may receive supplemental power to help power mobile device 101 from batter 2012 (or the like) coupled to mobile device 101 in response to a power spike from mobile device 101.

Turning now to FIG. 19, process 1900 may begin at operation 1901, "Supply Power to System and Monitor System Power Output", where processing logic such as power adapter logic 2010 may supply power to the system implementing mobile platform 2020 and power adapter logic 2010 may monitor power output of the system implementing mobile platform 2020. For example, power adapter logic 2010 may supply power to platform 2020 via power adapter 2008 and/or batter 2012 and power adapter logic 2010 may monitor mobile platform 2020.

Process 1900 may continue at decision operation 1902, "Receive Power Spike?", where processing logic such as power adapter logic 2010 may determine if a power spike is imminent or occurring. If a power spike is not occurring nor is a power spike imminent, then process 1900 may continue at operation 1901 as shown such that the processing logic such as power adapter logic 2010 may supply power to the system implementing mobile platform 2020 and power adapter logic 2010 may monitor power output of the system implementing mobile platform 2020 as discussed above.

If a power spike is occurring, process 1900 may continue at operation 1903, "Limit Output Current of DC/DC Converter and Lower Processor Frequency", where processing logic such as power adapter logic 2010 may limit the output current of power adapter 2008 via, for example, limiting the output current of a DC/DC converter in power adapter 2008 and where processing logic such as power adapter logic 2010 may reduce a frequency of processor 2000 in the system implementing platform 2020 such that power adapter 2008 may adequately meet the power requirement of the system implementing platform 2020 during the power spike.

The operations of process 1900 may be repeated any number of times to handle power spikes in a system implementing platform 2020. Furthermore, in some examples, power adapter logic 2010 may implement operations 1803 and 1903 separately and, in other examples, power adapter logic 2010 may implement operations 1803 and 1903 simultaneously. Furthermore, in some examples, power adapter logic 2010 may implement operation 1803 for some power spikes and operation 1903 for other power spikes. For example, a decision as to whether to implement operation 1803, operation 1903, or operations 1803 and 1903 simultaneously may be made based on a capacity or remaining life of battery 2012, an operating frequency of processor 2000, or other operating parameter of platform 2020.

Although the description utilized the embodiment of a low power consuming laptop as the mobile device (e.g., mobile device 101) that the adapter (e.g., voltage adapter 102) is used to power, in other embodiments the adapter described may be utilized for tablets, smartphones, or other mobile platforms that, generally, have batteries to provide power when not plugged into an AC outlet.

Various components of the systems described herein may be implemented in software, firmware, and/or hardware and/or any combination thereof. For example, various components of mobile device 101 or platforms 410 or 2020 1000 may be provided, at least in part, by hardware of a computing System-on-a-Chip (SoC). Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of mobile device 101 or platforms 410 or 2020, or any other modules, component, or systems as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 21:
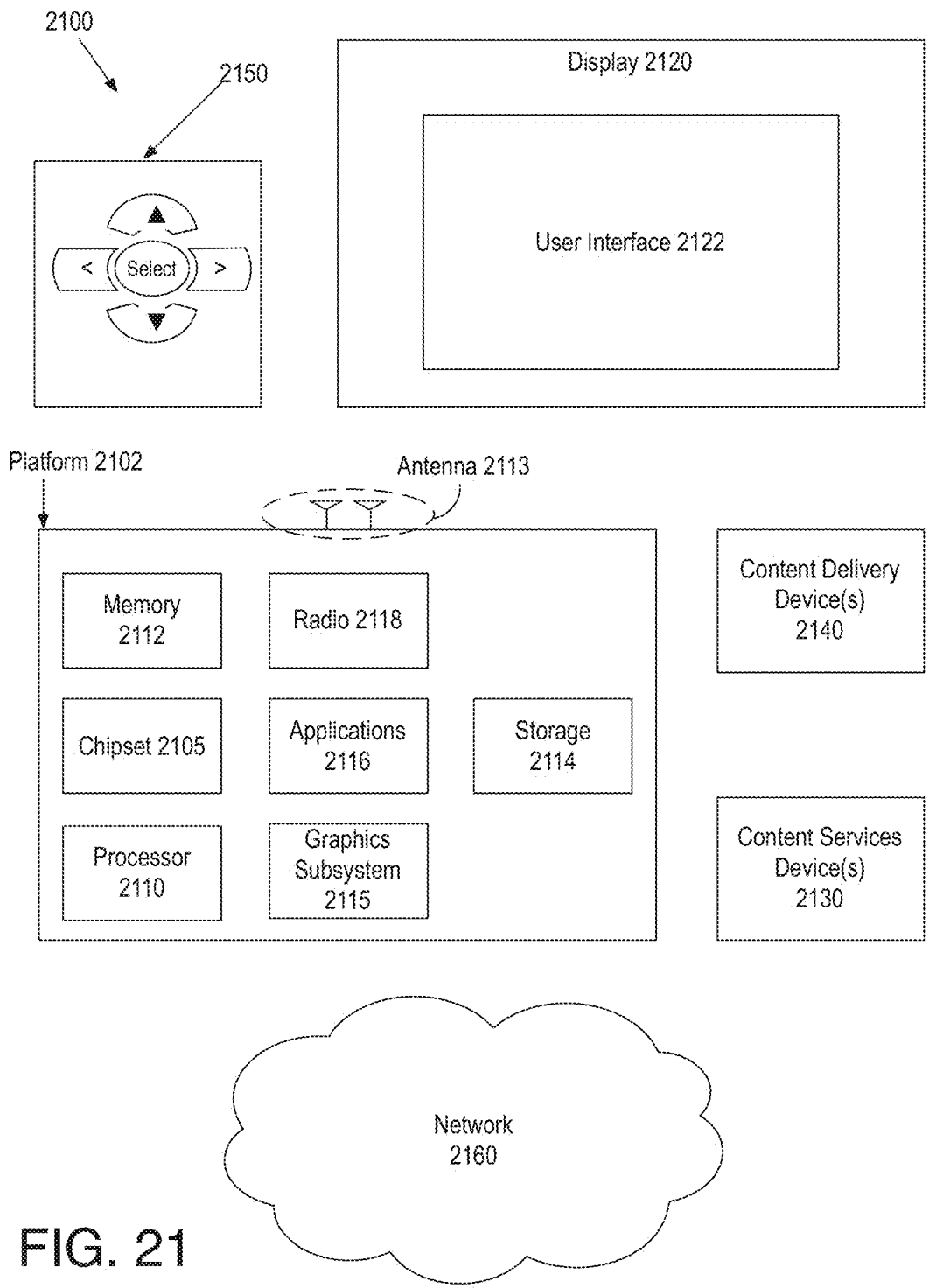
FIG. 21 is an illustrative diagram of an example system.

FIG. 21 is an illustrative diagram of an example system 2100, arranged in accordance with at least some implementations of the present disclosure. In various implementations, system 2100 may be an ultrabook system although system 2100 is not limited to this context. For example, system 2100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2100 includes a platform 2102 coupled to a display 2120. Platform 2102 may receive content from a content device such as content services device(s) 2130 or content delivery device(s) 2140 or other similar content sources. A navigation controller 2150 including one or more navigation features may be used to interact with, for example, platform 2102 and/or display 2120. Each of these components is described in greater detail below.

In various implementations, platform 2102 may include any combination of a chipset 2105, processor 2110, memory 2112, antenna 2113, storage 2114, graphics subsystem 2115, applications 2116 and/or radio 2118. Chipset 2105 may provide intercommunication among processor 2110, memory 2112, storage 2114, graphics subsystem 2115, applications 2116 and/or radio 2118. For example, chipset 2105 may include a storage adapter (not depicted) capable of providing intercommunication with storage 2114.

Processor 2110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2110 may be dual-core processor(s), dual-core mobile processor(s), and so forth.

Memory 2112 may be implemented as a volatile memory device such as, but not limited to, a Random Access Memory (RAM), Dynamic Random Access Memory (DRAM), or Static RAM (SRAM).

Storage 2114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2114 may include technology to increase the storage performance enhanced protection for valuable digital media when multiple hard drives are included, for example.

Graphics subsystem 2115 may perform processing of images such as still or video for display. Graphics subsystem 2115 may be a graphics processing unit (GPU) or a visual processing unit (VPU), for example. An analog or digital interface may be used to communicatively couple graphics subsystem 2115 and display 2120. For example, the interface may be any of a High-Definition Multimedia Interface, DisplayPort, wireless HDMI, and/or wireless HD compliant techniques. Graphics subsystem 2115 may be integrated into processor 2110 or chipset 2105. In some implementations, graphics subsystem 2115 may be a stand-alone device communicatively coupled to chipset 2105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2118 may operate in accordance with one or more applicable standards in any version.

In various implementations, display 2120 may include any television type monitor or display. Display 2120 may include, for example, a computer display screen, touch screen display, video monitor, television-like device, and/or a television. Display 2120 may be digital and/or analog. In various implementations, display 2120 may be a holographic display. Also, display 2120 may be a transparent surface that may receive a visual projection. Such projections may convey various forms of information, images, and/or objects. For example, such projections may be a visual overlay for a mobile augmented reality (MAR) application. Under the control of one or more software applications 2116, platform 2102 may display user interface 2122 on display 2120.

In various implementations, content services device(s) 2130 may be hosted by any national, international and/or independent service and thus accessible to platform 2102 via the Internet, for example. Content services device(s) 2130 may be coupled to platform 2102 and/or to display 2120. Platform 2102 and/or content services device(s) 2130 may be coupled to a network 2160 to communicate (e.g., send and/or receive) media information to and from network 2160. Content delivery device(s) 2140 also may be coupled to platform 2102 and/or to display 2120.

In various implementations, content services device(s) 2130 may include a cable television box, personal computer, network, telephone, Internet enabled devices or appliance capable of delivering digital information and/or content, and any other similar device capable of uni-directionally or bi-directionally communicating content between content providers and platform 2102 and/display 2120, via network 2160 or directly. It will be appreciated that the content may be communicated uni-directionally and/or bi-directionally to and from any one of the components in system 2100 and a content provider via network 2160. Examples of content may include any media information including, for example, video, music, medical and gaming information, and so forth.

Content services device(s) 2130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2102 may receive control signals from navigation controller 2150 having one or more navigation features. The navigation features of controller 2150 may be used to interact with user interface 2122, for example. In various embodiments, navigation controller 2150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2150 may be replicated on a display (e.g., display 2120) by movements of a pointer, cursor, focus ring, or other visual indicators displayed on the display. For example, under the control of software applications 2116, the navigation features located on navigation controller 2150 may be mapped to virtual navigation features displayed on user interface 2122, for example. In various embodiments, controller 2150 may not be a separate component but may be integrated into platform 2102 and/or display 2120. The present disclosure, however, is not limited to the elements or in the context shown or described herein.

In various implementations, drivers (not shown) may include technology to enable users to instantly turn on and off platform 2102 like a television with the touch of a button after initial boot-up, when enabled, for example. Program logic may allow platform 2102 to stream content to media adaptors or other content services device(s) 2130 or content delivery device(s) 2140 even when the platform is turned "off." In addition, chipset 2105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2100 may be integrated. For example, platform 2102 and content services device(s) 2130 may be integrated, or platform 2102 and content delivery device(s) 2140 may be integrated, or platform 2102, content services device(s) 2130, and content delivery device(s) 2140 may be integrated, for example. In various embodiments, platform 2102 and display 2120 may be an integrated unit. Display 2120 and content service device(s) 2130 may be integrated, or display 2120 and content delivery device(s) 2140 may be integrated, for example. These examples are not meant to limit the present disclosure.

In various embodiments, system 2100 may be implemented as a wireless system, a wired system, or a combination of both. When implemented as a wireless system, system 2100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 21.

Figure 22:
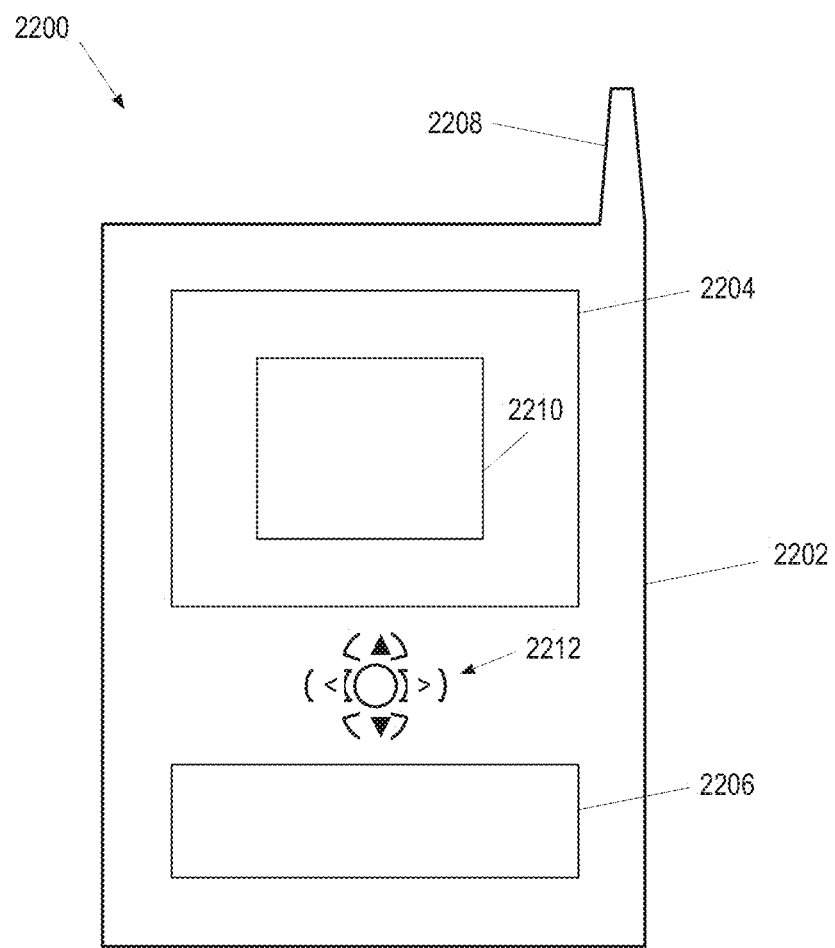
FIG. 22 illustrates an example device, all arranged in accordance with at least some implementations of the present disclosure.

As described above, system 2100 may be embodied in varying physical styles or form factors. FIG. 22 illustrates implementations of a small form factor device 2200 in which system 2100 may be embodied. In various embodiments, for example, device 2200 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 22, device 2200 may include a housing 2202, a display 2204, an input/output (I/O) device 2206, and an antenna 2208. Device 2200 also may include navigation features 2212. Display 2204 may include any suitable display unit for displaying information appropriate for a mobile computing device. I/O device 2206 may include any suitable I/O device for entering information into a mobile computing device. Examples for I/O device 2206 may include an alphanumeric keyboard, a numeric keypad, a touch pad, input keys, buttons, switches, rocker switches, microphones, speakers, voice recognition device and software, and so forth. Information also may be entered into device 2200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

The following examples pertain to further embodiments.

In one or more first embodiments, a voltage adapter to power a mobile device comprises a switch and a transformer coupled to the switch, an output rectifier coupled to the transformer, an output decoupler capacitor coupled to the output rectifier and configured to provide a direct current output from the voltage adapter, and an adapter output power protection controller coupled to the switch and configured to provide a maximum output power or current to the output decoupler capacitor in response to a power pulse exceeding a maximum output of the voltage adapter.

Further to the first embodiments, the adapter output power protection controller is configured to control the transformer via the switch to provide the maximum output power by being configured to limit a duty cycle of the transformer.

Further to the first embodiments, the adapter output power protection controller is configured to allow an output voltage of the voltage adapter to droop during the power pulse.

Further to the first embodiments, the adapter output power protection controller is configured to control the transformer via the switch to provide the maximum output power by being configured to limit a duty cycle of the transformer and/or wherein the adapter output power protection controller is configured to allow an output voltage of the voltage adapter to droop during the power pulse.

Further to the first embodiments, the voltage adapter further comprises a housing and alternating current (AC) prongs configured to pivot between an enclosed position within the housing to an extended position wherein at least a portion of the AC prongs are outside of the housing.

Further to the first embodiments, the voltage adapter further comprises a housing and alternating current (AC) prongs configured to pivot between an enclosed position within the housing to an extended position wherein at least a portion of the AC prongs are outside of the housing, wherein the AC prongs are within a first region of the housing in the enclosed position and wherein the transformer, the output rectifier, the output decoupler capacitor, and the adapter output power protection controller are within a second region of the housing adjacent to the first region.

Further to the first embodiments, the voltage adapter further comprises a housing, alternating current (AC) prongs configured to pivot between an enclosed position within the housing to an extended position wherein at least a portion of the AC prongs are outside of the housing, and a wire having a coupler, wherein the wire is configured to extend to the mobile device, and wherein the housing comprises an exterior groove extending around the housing for storing the wire when not in use.

Further to the first embodiments, the voltage adapter further comprises a housing, alternating current (AC) prongs configured to pivot between an enclosed position within the housing to an extended position wherein at least a portion of the AC prongs are outside of the housing, a wire having a coupler, wherein the wire is configured to extend to the mobile device, and wherein the housing comprises an exterior groove extending around the housing for storing the wire when not in use, a second groove in the housing configured to receive the coupler, and a magnet in the housing configured to hold the coupler in place when not in use.

Further to the first embodiments, a housing, alternating current (AC) prongs configured to pivot between an enclosed position within the housing to an extended position wherein at least a portion of the AC prongs are outside of the housing, and/or a wire having a coupler, wherein the wire is configured to extend to the mobile device, and wherein the housing comprises an exterior groove extending around the housing for storing the wire when not in use.

Further to the first embodiments, a housing, alternating current (AC) prongs configured to pivot between an enclosed position within the housing to an extended position wherein at least a portion of the AC prongs are outside of the housing, a wire having a coupler, wherein the wire is configured to extend to the mobile device, and wherein the housing comprises an exterior groove extending around the housing for storing the wire when not in use, a second groove in the housing configured to receive the coupler, and a magnet in the housing configured to hold the coupler in place when not in use.

Further to the first embodiments, the voltage adapter further comprises an input rectifier configured to convert an alternating current input to a direct current (DC) and a power smoothing capacitor coupled between the input rectifier and the transformer.

In one or more second embodiments, a voltage adapter to power a mobile device, the voltage adapter comprises an input rectifier configured to convert an alternating current input to a direct current (DC), a DC-DC converter configured to convert the DC to an output DC, and an adapter output power protection controller coupled to the DC-DC converter and configured to control the DC-DC converter to provide a maximum output power or a maximum output current in response to a power pulse on the voltage adapter exceeding a maximum output of the voltage adapter.

Further to the second embodiments, the adapter output power protection controller is configured to control the DC-DC converter by being configured to limit a duty cycle of a transformer of the DC-DC converter.

Further to the second embodiments, the adapter output power protection controller is configured to allow an output voltage of the voltage adapter to droop during the power pulse.

Further to the second embodiments, the adapter output power protection controller is configured to control the DC-DC converter by being configured to limit a duty cycle of a transformer of the DC-DC converter and/or wherein the adapter output power protection controller is configured to allow an output voltage of the voltage adapter to droop during the power pulse.

Further to the second embodiments, the voltage adapter further comprises a housing and alternating current (AC) prongs configured to pivot between an enclosed position within the housing to an extended position wherein at least a portion of the AC prongs are outside of the housing.

Further to the second embodiments, the voltage adapter further comprises a housing and alternating current (AC) prongs configured to pivot between an enclosed position within the housing to an extended position wherein at least a portion of the AC prongs are outside of the housing, wherein the AC prongs are within a first region of the housing in the enclosed position and wherein the DC-DC converter and the adapter output power protection controller are within a second region of the housing adjacent to the first region.

Further to the second embodiments, the voltage adapter further comprises a housing, alternating current (AC) prongs configured to pivot between an enclosed position within the housing to an extended position wherein at least a portion of the AC prongs are outside of the housing, and a wire having a coupler, wherein the wire is configured to extend to a mobile device, and wherein the housing comprises an exterior groove extending around the housing for storing the wire when not in use.

Further to the second embodiments, the voltage adapter further comprises a housing, alternating current (AC) prongs configured to pivot between an enclosed position within the housing to an extended position wherein at least a portion of the AC prongs are outside of the housing, a wire having a coupler, wherein the wire is configured to extend to a mobile device, and wherein the housing comprises an exterior groove extending around the housing for storing the wire when not in use, a second groove in the housing configured to receive the coupler, and a magnet in the housing configured to hold the coupler in place when not in use.

Further to the second embodiments, the voltage adapter further comprises a housing and alternating current (AC) prongs configured to pivot between an enclosed position within the housing to an extended position wherein at least a portion of the AC prongs are outside of the housing and/or a wire having a coupler, wherein the wire is configured to extend to a mobile device, and wherein the housing comprises an exterior groove extending around the housing for storing the wire when not in use.

Further to the second embodiments, the DC-DC converter comprises a switch and a transformer and an output rectifier.

In one or more third embodiments, a voltage adapter to power a mobile device comprises means for converting an alternating current input to a direct current (DC), means for converting the DC to an output DC, and means for providing a maximum output power or a maximum output current in response to a power pulse on the voltage adapter exceeding a maximum output of the voltage adapter.

Further to the third embodiments, the voltage adapter is configured to allow an output voltage of the voltage adapter droop during the power pulse.

Further to the third embodiments, the voltage adapter further comprises a housing, means for pivoting alternating current (AC) prongs between an enclosed position within the housing an extended position wherein at least a portion of the AC prongs are outside of the housing, a wire having a means for coupling the voltage adapter to the mobile device, and a means for storing the wire when not in use.

Further to the third embodiments, the voltage adapter further comprises a housing, means for pivoting alternating current (AC) prongs between an enclosed position within the housing an extended position wherein at least a portion of the AC prongs are outside of the housing, a wire having a means for coupling the voltage adapter to the mobile device, a means for storing the wire when not in use, and a means for holding the coupler in place when not in use In one or more fourth embodiments, a mobile device-implemented method for a mobile device connected to a voltage adapter comprises implementing a power boost operation for a first duration, wherein the first duration is not greater than a maximum power boost duration associated the voltage adapter, restricting use of a second power boost operation for at least a predetermined duration, wherein the predetermined duration is associated with a recharge time associated with the voltage adapter, and implementing the second power boost operation after the predetermined duration and for a second duration not greater than the maximum power boost duration.

Further to the fourth embodiments, the maximum power boost duration and the recharge time are associated with an output decoupler capacitor of the voltage adapter.

Further to the fourth embodiments, the maximum power boost duration is not more than 5 milliseconds and the recharge time of the output decoupler capacitor is not more than 100 milliseconds.

Further to the fourth embodiments, the power boost operation makes a demand for power exceeding a maximum output of the voltage adapter.

Further to the fourth embodiments, the method further comprises detecting a battery unavailable indicator at the mobile device and entering a lower power boost operating mode in response to the battery unavailable indicator.

In one or more fifth embodiments, a system for managing a voltage adapter for a mobile device comprises a memory configured to store power management data, a central processing unit coupled to the memory, wherein the central processing unit comprises power management circuitry configured to implement a power boost operation for a first duration, wherein the first duration is not greater than a maximum power boost duration associated the voltage adapter, restrict use of a second power boost operation for at least a predetermined duration, wherein the predetermined duration is associated with a recharge time associated with the voltage adapter, and implement the second power boost operation after the predetermined duration and for a second duration not greater than the maximum power boost duration.

Further to the fifth embodiments, the maximum power boost duration and the recharge time are associated with an output decoupler capacitor of the voltage adapter.

Further to the fifth embodiments, the maximum power boost duration is not more than 5 milliseconds and the recharge time of the output decoupler capacitor is not more than 100 milliseconds.

Further to the fifth embodiments, the power boost operation makes a demand for power exceeding a maximum output of the voltage adapter.

Further to the fifth embodiments, the power management circuitry is further configured to detect a battery unavailable indicator at the mobile device and enter a lower power boost operating mode in response to the battery unavailable indicator.

In one or more sixth embodiments, at least one machine readable medium comprises a plurality of instructions that in response to being executed on a computing device, cause the computing device to manage a voltage adapter by implementing a power boost operation for a first duration, wherein the first duration is not greater than a maximum power boost duration associated the voltage adapter, restricting use of a second power boost operation for at least a predetermined duration, wherein the predetermined duration is associated with a recharge time associated with the voltage adapter, and implementing the second power boost operation after the predetermined duration and for a second duration not greater than the maximum power boost duration.

Further to the sixth embodiments, the maximum power boost duration and the recharge time are associated with an output decoupler capacitor of the voltage adapter.

Further to the sixth embodiments, the maximum power boost duration is not more than 5 milliseconds and the recharge time of the output decoupler capacitor is not more than 100 milliseconds.

Further to the sixth embodiments, the machine readable medium comprises further instructions that in response to being executed on a computing device, cause the computing device to manage the voltage adapter by detecting a battery unavailable indicator at the mobile device and entering a lower power boost operating mode in response to the battery unavailable indicator.

In on or more seventh embodiments, at least one machine readable medium may include a plurality of instructions that in response to being executed on a computing device, causes the computing device to perform a method according to any one of the above embodiments.

In on or more eighth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A voltage adapter to power a mobile device, the voltage adapter comprising:
    a switch and a transformer coupled to the switch;
    an output rectifier coupled to the transformer;
    an output decoupler capacitor coupled to the output rectifier and configured to provide a direct current output from the voltage adapter; and
    an adapter output power protection controller coupled to the switch, the adapter output power protection controller to determine a draw on the voltage adapter from the mobile device and, when the draw is less than a maximum output power of the voltage adapter, to maintain a constant output voltage of the voltage adapter and, when the draw is greater than the maximum output power due to a power pulse from the mobile device exceeding the maximum output power, to provide a constant output power or a constant output current of the voltage adapter and allow the output voltage of the voltage adapter to droop during the power pulse.

2. The voltage adapter of claim 1, wherein the adapter output power protection controller is to control the transformer via the switch to provide the constant output power or current by being configured to limit a duty cycle of the transformer.

3. The voltage adapter of claim 1, further comprising:
    a housing; and
    alternating current (AC) prongs configured to pivot between an enclosed position within the housing to an extended position wherein at least a portion of the AC prongs are outside of the housing.

4. The voltage adapter of claim 1, further comprising:
    an input rectifier configured to convert an alternating current input to a direct current (DC); and
    a power smoothing capacitor coupled between the input rectifier and the transformer.

5. A system comprising the voltage adapter and the mobile device of claim 1, wherein the mobile device comprises a mobile device platform comprising a processor and a local battery, the mobile device platform to, during the power droop, partially power the mobile device using the local battery and reduce performance of the processor.

6. The voltage adapter of claim 3, wherein the AC prongs are within a first region of the housing in the enclosed position and wherein the transformer, the output rectifier, the output decoupler capacitor, and the adapter output power protection controller are within a second region of the housing adjacent to the first region.

7. The voltage adapter of claim 3, further comprising:
a wire having a coupler, wherein the wire is configured to extend to the mobile device, and wherein the housing comprises an exterior groove extending around the housing for storing the wire when not in use.

8. The voltage adapter of claim 7, further comprising:
a second groove in the housing configured to receive the coupler; and
a magnet in the housing configured to hold the coupler in place when not in use.

9. A voltage adapter to power a mobile device, the voltage adapter comprising:
an input rectifier configured to convert an alternating current input to a direct current (DC);
a DC-DC converter configured to convert the DC to an output DC; and
an adapter output power protection controller coupled to the DC-DC converter, the adapter output power protection controller to determine a draw on the voltage adapter from the mobile device and, when the draw is less than a maximum output power of the voltage adapter, to maintain a constant output voltage of the voltage adapter and, when the draw is greater than the maximum output power due to a power pulse from the mobile device exceeding the maximum output power, to provide a constant output power or current of the voltage adapter and allow the output voltage of the voltage adapter to droop during the power pulse.

10. The voltage adapter of claim 9, wherein the adapter output power protection controller is configured to control the DC-DC converter by being configured to limit a duty cycle of a transformer of the DC-DC converter.

11. The voltage adapter of claim 9, further comprising:
a housing; and
alternating current (AC) prongs configured to pivot between an enclosed position within the housing to an extended position wherein at least a portion of the AC prongs are outside of the housing.

12. The voltage adapter of claim 9, wherein the DC-DC converter comprises a switch and a transformer and an output rectifier.

13. A system comprising the voltage adapter and the mobile device of claim 9, wherein the mobile device comprises a mobile device platform comprising a processor and a local battery, the mobile device platform to, during the power droop, partially power the mobile device using the local battery and reduce performance of the processor.

14. The voltage adapter of claim 11, wherein the AC prongs are within a first region of the housing in the enclosed position and wherein the DC-DC converter and the adapter output power protection controller are within a second region of the housing adjacent to the first region.

15. The voltage adapter of claim 11, further comprising:
a wire having a coupler, wherein the wire is configured to extend to a mobile device, and wherein the housing comprises an exterior groove extending around the housing for storing the wire when not in use.

16. The voltage adapter of claim 15, further comprising:
a second groove in the housing configured to receive the coupler; and
a magnet in the housing configured to hold the coupler in place when not in use.

17. A mobile device-implemented method for a mobile device platform connected to a voltage adapter external to the mobile device, the method comprising:
limiting a power boost operation of the mobile device to a first duration, wherein the power boost operation demands a power pulse from the voltage adapter that is above a maximum output power of the voltage adapter, and wherein the first duration is limited by the mobile device platform to a duration not greater than a maximum power boost duration of the voltage adapter;
eliminating, by the mobile device platform, use of a second power boost operation during a predetermined duration after the first duration of the power boost operation that is not less than a recharge time of the voltage adapter; and
implementing the second power boost operation only after the predetermined duration and limiting the second power boost operation to a second duration limited by the mobile device platform to a duration not greater than the maximum power boost duration of the voltage adapter.

18. The method of claim 17, wherein the maximum power boost duration and the recharge time are associated with an output decoupler capacitor of the voltage adapter.

19. The method of claim 17, wherein the maximum power boost duration is not more than 5 milliseconds and the recharge time of the output decoupler capacitor is not more than 100 milliseconds.

20. The method of claim 17, wherein the power boost operation makes a demand for power exceeding a maximum output of the voltage adapter.

21. The method of claim 17, further comprising:
detecting a battery unavailable indicator at the mobile device; and
entering a lower power boost operating mode in response to the battery unavailable indicator, wherein limiting the power boost operation to the first duration, restricting use of a second power boost operation during the predetermined duration, and implementing the second power boost operation only after the predetermined duration and limiting the second power boost operation to the second duration are responsive to the battery being detected as unavailable and the lower power boost operating mode.

22. The method of claim 21, further comprising, when the battery of the mobile device is available:
implementing, by the mobile platform, a third power boost operation and supplementing power from the battery during the third power boost operation.

* * * * *